United States Patent [19]

Michel et al.

[11] 4,083,964
[45] Apr. 11, 1978

[54] ANTIBIOTIC A-35512 FOR INCREASING FEED UTILIZATION EFFICIENCY IN AN ANIMAL

[75] Inventors: Karl H. Michel; Calvin E. Higgens, both of Indianapolis, Ind.

[73] Assignee: Eli Lilly and Company, Indianapolis, Ind.

[21] Appl. No.: 722,936

[22] Filed: Sep. 13, 1976

Related U.S. Application Data

[62] Division of Ser. No. 689,274, May 24, 1976, abandoned.

[51] Int. Cl.² ............................................. A61K 35/74
[52] U.S. Cl. .................................... 424/118; 424/115
[58] Field of Search ............................... 424/118, 115; 145/800 R

[56] References Cited

U.S. PATENT DOCUMENTS 3,969,501  7/1976  Shoji et al. ............................ 424/118

*Primary Examiner*—Jerome D. Goldberg
*Attorney, Agent, or Firm*—Nancy J. Harrison; Everet F. Smith

[57] ABSTRACT

Antibiotic A-35512 complex, comprising microbiologically active, related factors A, B, C, E and H, is produced by submerged aerobic fermentation of *Streptomyces candidus* NRRL 8156. The individual A-35512 factors are separated and isolated by chromatography. The A-35512 antibiotics are antibacterial and growth-promoting agents and increase feed-utilization efficiency in animals. In addition, A-35512 factor B is useful in the treatment of dental caries and acne.

9 Claims, 5 Drawing Figures

4,083,964

ANTIBIOTIC A-35512 FOR INCREASING FEED UTILIZATION EFFICIENCY IN AN ANIMAL

This is a division of application Ser. No. 689,274 filed May 24, 1976, now abandoned.

BACKGROUND OF THE INVENTION

1. Field of the Invention

Although many antibacterial agents are known today, the need for new, improved antibiotics continues. One problem in current antibiotic therapy is the fact that antibiotics differ in their effectiveness against pathogenic organisms. Another problem is the fact that organism strains continually develop which are resistant to currently-used antibiotics. Yet another problem is the fact that individual patients often suffer serious reactions to specific antibiotics, due to hypersensitivity and/or to toxic effects. Because of these problems in current therapy, new antibiotics continue to be needed.

2. The Prior Art

The A-35512 antibiotics are closely related, glycopeptide antibiotics. Antibiotic A-35512 factor B, the most completely characterized member of the A-35512 antibiotic complex, appears to be a new member of the group of peptide-containing antibiotics which includes vancomycin; A-4696 A, B, and C; LL-AV290; ristomycin A; and ristocetin A. The A-35512 antibiotics differ from these known antibiotics in, for example, movement in various chromatographic systems and amino-acid and sugar content.

SUMMARY OF THE INVENTION

This invention relates to antibiotic substances. In particular, it relates to an antibiotic complex comprising several factors, including individual factors A, B, C, E and H. This complex is produced by culturing a hitherto undescribed strain of the organism *Streptomyces candidus* NRRL 8156.

The term "complex" as used in the fermentation art and in this specification refers to a mixture of co-produced individual antibiotic factors. As will be recognized by those familiar with antibiotic production by fermentation, the number and ratio of individual factors produced in an antibiotic complex will vary, depending upon the fermentation conditions used.

The antibiotic substances of this invention are arbitrarily designated herein as A-35512 antibiotics. The A-35512 complex contains several individual factors which are designated antibiotic A-35512 factors A, B, C, E, F, G, and H. Individual A-35512 factors A, B, C, E and H and the pharmaceutically-acceptable salts of A-35512 factors A, B, C, E and H are also part of this invention. Factor B is the major factor in the A-35512 complex. The A-35512 factors occur in the A-35512 complex and are recovered individually from the complex as hydrochloride salts. Each individual factor may be converted to its free base (ionic-chlorine free) form by, for example, chromatography over a weakly-basic ion-exchange resin. In addition to the free base and hydrochloride forms, other pharmaceutically-acceptable salts of the A-35512 factors are also useful. In discussions of utility, the term "A-35512 compound" will be used, for the sake of brevity, to denote a compound selected from the group consisting of A-35512 factors A, B, C, E and H and the pharmaceutically-acceptable salts thereof.

The A-35512 complex is produced by culturing the novel strain of *Streptomyces candidus* NRRL 8156 under submerged aerobic fermentation conditions until a substantial level of antibiotic activity is produced. The A-35512 complex is most readily separated from the filtered fermentation broth by absorption on a resin column, elution of the column with an aqueous alcohol solution, and evaporation of the eluates to obtain the A-35512 complex. The A-35512 complex can be further purified and separated into individual factors by chromatography. The A-35512 antibiotics of this invention inhibit the growth of organisms which are pathogenic to animal and plant life. The A-35512 antibiotics also are growth-promoting agents and increase feed-utilization efficiency in animals. A-35512 factor B inhibits organisms which cause dental caries and acne.

DESCRIPTION OF THE DRAWINGS

Infrared absorption spectra (in KBr pellet) of the following A-35512 factors are presented in the drawings as follows.

DETAILED DESCRIPTION OF THE INVENTION

The A-35512 factors of this invention are closely related compounds. As many as seven antibiotic factors are recovered from the fermentation and are obtained as a mixture, the A-35512 complex. The individual factors are separated from each other; and factors A, B, C, E and H are isolated as individual compounds as hereinafter described. The A-35512 complex is soluble in water; is partially soluble in alcohols such as methanol and ethanol; but is insoluble in other organic solvents such as benzene, chloroform, acetone, diethyl ether, ethyl acetate, toluene, hexane, acetonitrile and dioxane.

A-35512 Factor A

A-35512 factor A is a white, amorphous, basic compound. A-35512 factor A has the following approximate percentage elemental composition:

Carbon, 54.29%; hydrogen, 5.19%;
nitrogen, 5.58%; oxygen, 33.76%;
chlorine, 1.69%.

A-35512 factor A dihydrochloride is a white, amorphous, hygroscopic compound. A-35512 factor A dihydrochloride has the following average percentage elemental composition:

Carbon, 51.03%; hydrogen, 5.10%;
nitrogen, 4.75%; oxygen, 34.20%;
chlorine, 4.80%.

Figure 1:
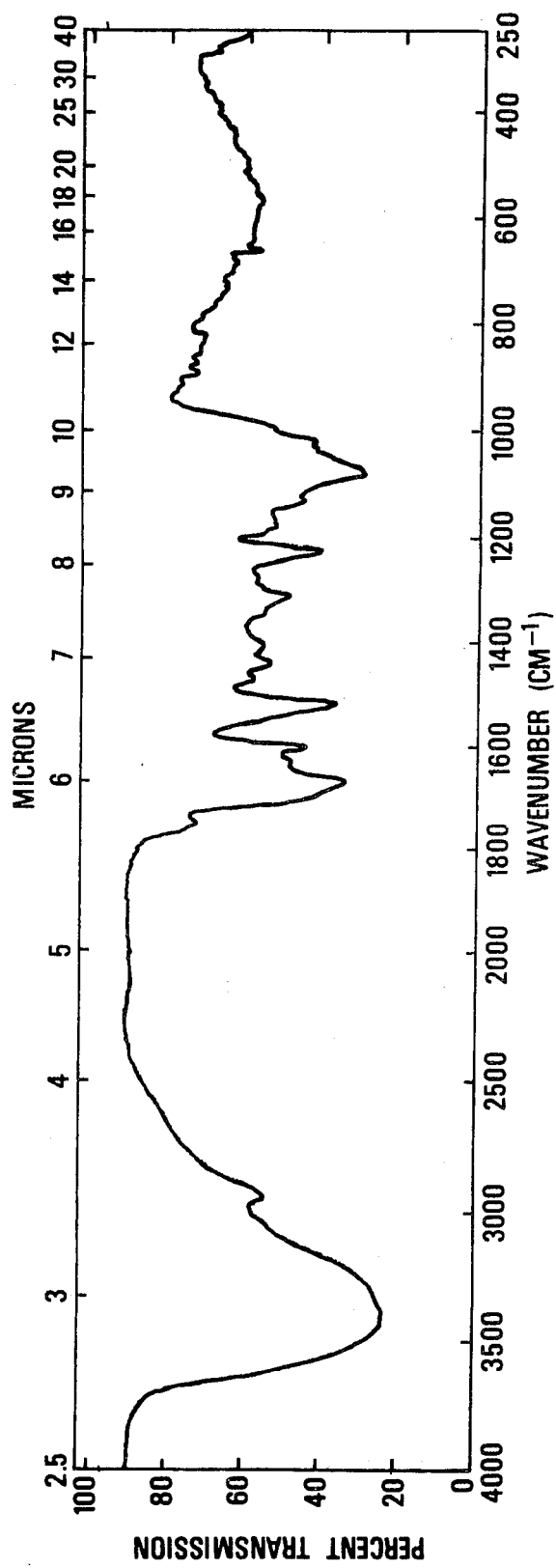
FIG. 1 — A-35512 factor A dihydrochloride

The infrared absorption spectrum of A-35512 factor A dihydrochloride in KBr pellet is shown in FIG. 1 of the accompanying drawings. The most significant absorption maxima occur at the following frequencies (cm$^{-1}$): 3405 (strong), 3300 (shoulder), 2950 (weak), 1750 (weak), 1670 (strong), 1625 (shoulder), 1602 (strong), 1520 (strong), 1470 (weak), 1440 (weak), 1405 (weak), 1345 (shoulder), 1312 (medium), 1225 (medium), 1180 (weak), 1130 (weak), 1080 (strong), and 1020 (shoulder).

The ultraviolet (uv) absorption spectra of A-35512 factor A dihydrochloride show, in acidic and neutral methanol, an absorption maximum at 282 nm ($\epsilon$ 11,700) and, in basic methanol, an absorption maximum at 292 nm ($\epsilon$ 14,000), calculated using a molecular weight of 2,000. The uv spectra of A-35512 factor A dihydrochloride also show end absorption at 225 nm.

A $^{13}$C nuclear-magnetic-resonance spectrum of A-35512 factor A dihydrochloride in D$_2$O has the following characteristics:

| No. | PPM | Height (%) |
|---|---|---|
| 3 | 175.3 | 0.8 |
| 4 | 173.0 | 2.1 |
| 5 | 172.1 | 2.0 |
| 6 | 171.4 | 1.5 |
| 7 | 170.9 | 2.7 |
| 8 | 170.5 | 2.3 |
| 9 | 169.5 | 1.6 |
| 10 | 159.0 | 1.3 |
| 11 | 157.9 | 2.3 |
| 12 | 156.2 | 2.6 |
| 13 | 155.6 | 2.3 |
| 14 | 155.3 | 2.4 |
| 15 | 154.4 | 1.1 |
| 16 | 136.3 | 1.4 |
| 17 | 136.0 | 1.0 |
| 18 | 135.1 | 1.4 |
| 19 | 133.5 | 1.2 |
| 20 | 129.6 | 1.6 |
| 21 | 129.1 | 1.7 |
| 22 | 128.7 | 1.8 |
| 23 | 127.5 | 1.0 |
| 24 | 126.0 | 1.4 |
| 25 | 124.3 | 2.8 |
| 26 | 122.1 | 1.6 |
| 27 | 109.9 | 1.3 |
| 28 | 107.4 | 1.6 |
| 29 | 101.7 | 0.9 |
| 30 | 77.6 | 3.8 |
| 31 | 76.3 | 4.6 |
| 32 | 75.5 | 2.6 |
| 33 | 74.8 | 2.5 |
| 34 | 74.5 | 2.4 |
| 35 | 73.4 | 3.7 |
| 36 | 72.8 | 6.0 |
| 37 | 72.0 | 4.4 |
| 38 | 70.9 | 7.0 |
| 39 | 69.6 | 2.8 |
| 40 | 67.4 | 90.9* |
| 41 | 65.4 | 1.7 |
| 42 | 61.7 | 3.1 |
| 43 | 56.7 | 1.7 |
| 44 | 55.5 | 1.3 |
| 45 | 54.7 | 0.8 |
| 46 | 24.6 | 0.9 |
| 47 | 19.1 | 1.7 |
| 48 | 17.9 | 2.0 |
| 49 | 17.2 | 1.9 |
| 50 | 16.7 | 3.2 |
| 51 | 16.2 | 3.0 |

A-35512 factor A dihydrochloride has the following specific rotations:

$[\alpha]_D^{25}$ −100 (c 1, H$_2$O)

$[\alpha]_{365}^{25}$ −400 (c 1, H$_2$O). bioautography 5. fractions

Electrometric titration of A-35512 factor A dihydrochloride in 66 percent aqueous dimethylformamide indicates the presence of four titratable groups with pK$_a$ values of approximately 7.35, 9.09, 10.49, and 12.44 (initial pH 6.2).

The apparent molecular weight of A-35512 factor A dihydrochloride, as determined by titration, is about 2106.

A-35512 factor A dihydrochloride is soluble in water, is partially soluble in alcohols such as methanol and ethanol, but is generally insoluble in other organic solvents such as benzene, chloroform, acetone, diethyl ether, ethyl acetate, toluene, hexane, acetonitrile and dioxane.

A-35512 factor A dihydrochloride is stable for 72 hours in aqueous solutions having a pH of from about 3 to about 10.

Amino-acid analysis of acid-hydrolyzed A-35512 factor A dihydrochloride indicates that A-35512 factor A contains at least five amino-acid residues, one of which is glycine.

A-35512 Factor B

A-35512 factor B is a white, amorphous, basic compound. The approximate empirical formula for A-35512 factor B is C$_{97-99}$H$_{101-105}$N$_{8-9}$O$_{46-48}$Cl. A-35512 factor B has the following average percentage elemental composition:

Carbon, 53.97%; hydrogen, 4.75%;
nitrogen, 5.25%; oxygen, 34.29%;
chlorine, 1.59%.

This elemental composition is in particular agreement with a preferred empirical formula of C$_{98}$H$_{104}$N$_9$O$_{47}$Cl (Calcd: C, 53.60; H, 4.75; N, 5.74; O, 34.30; Cl, 1.61). An alternative preferred empirical formula is C$_{98}$H$_{103}$N$_8$O$_{47}$Cl (Calcd: C, 54.00; H, 4.75; N, 5.15; O, 34.50; Cl, 1.60).

The ultraviolet absorption (uv) spectra of A-35512 factor B show, in acidic and neutral methanol, an absorption maximum at 282 nm ($\epsilon$ 15000) and, in basic methanol, an absorption maximum at 292 nm ($\epsilon$ 16000), calculated using a molecular weight of 2000. The uv spectra of A-35512 factor B also show end-absorption at 225 nm.

A-35512 factor B has the following specific rotations:
$[\alpha]_D^{25}$ −123° (c 1, H$_2$O)
$[\alpha]_{365}^{25}$ −446° (c 1, H$_2$O).

Electrometric titration of A-35512 factor B in 66 percent aqueous dimethylformamide indicates the presence of four titratable groups with pK$_a$ values of approximately 7.15, 8.81, 10.20, 12.00 and the possible presence of another group with a pK$_a$ value greater than 13.50.

The apparent molecular weight of A-35512 factor B, as determined by titration, is about 2143.

A-35512 factor B dihydrochloride is a white crystalline compound (from 50 percent aqueous methanol). Although A-35512 factor B dihydrochloride is hygroscopic and does not exhibit a distinct melting point, a thermogram showed weight loss beginning at 25° C., resulting in a 7.4 percent loss at 121° C.; at 135° C. another loss occurred, resulting in decomposition.

A-35512 factor B dihydrochloride has the following approximate percentage elemental composition (average):

Carbon, 52.57%; hydrogen, 4.80%;
nitrogen, 5.66%; oxygen, 32.86%;
chlorine, 4.51%.

This elemental composition is in particular agreement with another alternative empirical formula of C$_{98}$H$_{103}$N$_9$O$_{47}$Cl.2HCl (Calcd: C, 51.93; H, 4.65; N, 5.57; O, 33.20; Cl, 4.65).

The uv spectra of A-35512 factor B dihydrochloride show, in acidic and neutral methanol, an absorption maximum at 282 nm ($\epsilon$ 12,000) and, in basic methanol, an absorption maximum at 292 nm ($\epsilon$ 14,000), calculated using a molecular weight of 2000. The uv spectra of A-35512 factor B dihydrochloride also show end-absorption at 225 nm.

A-35512 factor B dihydrochloride has the following specific rotations:
$[\alpha]_D^{25}$ −128° (c 1, H$_2$O)
$[\alpha]_{365}^{25}$ −475° (c 1, H$_2$O).

Electrometric titration of A-35512 factor B dihydrochloride in 66 percent aqueous dimethylformamide indicates the presence of four titratable groups with pK$_a$ values of approximately 7.15, 8.87, 10.30, and 12.10 and the possible presence of another group with a $pK_a$ greater than 13.1.

The apparent molecular weight of A-35512 factor B dihydrochloride, as determined by titration, is about 2027.

A $^{13}C$ nuclear-magnetic-resonance spectrum of A-35512 factor B dihydrochloride in $D_2O$ has the following characteristics:

| No. | PPM | Height (%) |
|---|---|---|
| 2 | 173.0 | 4.1 |
| 3 | 171.9 | 3.7 |
| 4 | 171.6 | 3.3 |
| 5 | 171.0 | 5.8 |
| 6 | 170.8 | 5.0 |
| 7 | 169.6 | 3.6 |
| 8 | 159.0 | 4.1 |
| 9 | 157.9 | 4.4 |
| 10 | 157.5 | 3.7 |
| 11 | 156.6 | 4.8 |
| 12 | 155.6 | 6.1 |
| 13 | 155.3 | 4.2 |
| 14 | 154.9 | 3.3 |
| 15 | 154.3 | 4.2 |
| 16 | 151.7 | 3.3 |
| 17 | 144.3 | 3.1 |
| 18 | 136.7 | 3.5 |
| 19 | 136.2 | 4.9 |
| 20 | 135.4 | 4.0 |
| 21 | 135.2 | 4.4 |
| 22 | 133.6 | 4.2 |
| 23 | 133.3 | 4.1 |
| 24 | 129.8 | 1.7 |
| 25 | 129.3 | 3.0 |
| 26 | 128.8 | 2.6 |
| 27 | 127.6 | 1.5 |
| 28 | 126.1 | 3.9 |
| 29 | 124.2 | 5.6 |
| 30 | 122.4 | 1.4 |
| 31 | 122.0 | 4.4 |
| 32 | 120.7 | 3.3 |
| 33 | 116.5 | 2.7 |
| 34 | 109.5 | 0.8 |
| 35 | 108.2 | 1.1 |
| 36 | 107.7 | 2.7 |
| 37 | 104.5 | 1.7 |
| 38 | 101.8 | 2.9 |
| 39 | 100.9 | 1.6 |
| 40 | 98.2 | 1.0 |
| 41 | 76.9 | 1.2 |
| 42 | 76.1 | 1.8 |
| 43 | 74.1 | 2.0 |
| 44 | 73.5 | 2.7 |
| 45 | 72.7 | 2.4 |
| 46 | 72.3 | 4.0 |
| 47 | 71.0 | 7.1 |
| 48 | 70.3 | 2.5 |
| 49 | 69.7 | 2.5 |
| 50 | 67.4 | 74.7* |
| 51 | 64.6 | 1.2 |
| 52 | 62.0 | 1.5 |
| 53 | 58.0 | 1.3 |
| 54 | 56.8 | 1.7 |
| 55 | 55.4 | 3.9 |
| 56 | 54.3 | 2.5 |
| 57 | 24.5 | 2.0 |
| 58 | 17.9 | 3.0 |
| 59 | 17.2 | 2.0 |
| 60 | 16.3 | 2.5 |

*dioxane standard

A-35512 factor B dihydrochloride, crystallized from methanol-water, has the following characteristic X-ray powder diffraction pattern ($Cu^{++}$ radiation, 1.5405 λ, nickel filter, $d$ = interplanar spacing in angstroms):

| d | Relative Intensity |
|---|---|
| 17.15 | 100 |
| 12.90 | 80 |
| 10.85 | 70 |
| 9.25 | 70 |
| 8.87 | 60 |
| 8.22 | 50 |
| 7.86 | 50 |
| 6.93 | 40 |

-continued

| d | Relative Intensity |
|---|---|
| 6.20 | 40 |
| 5.62 | 40 |
| 5.04 | 05 |
| 4.02 | 02 |
| 3.54 | 02 |

Figure 2:
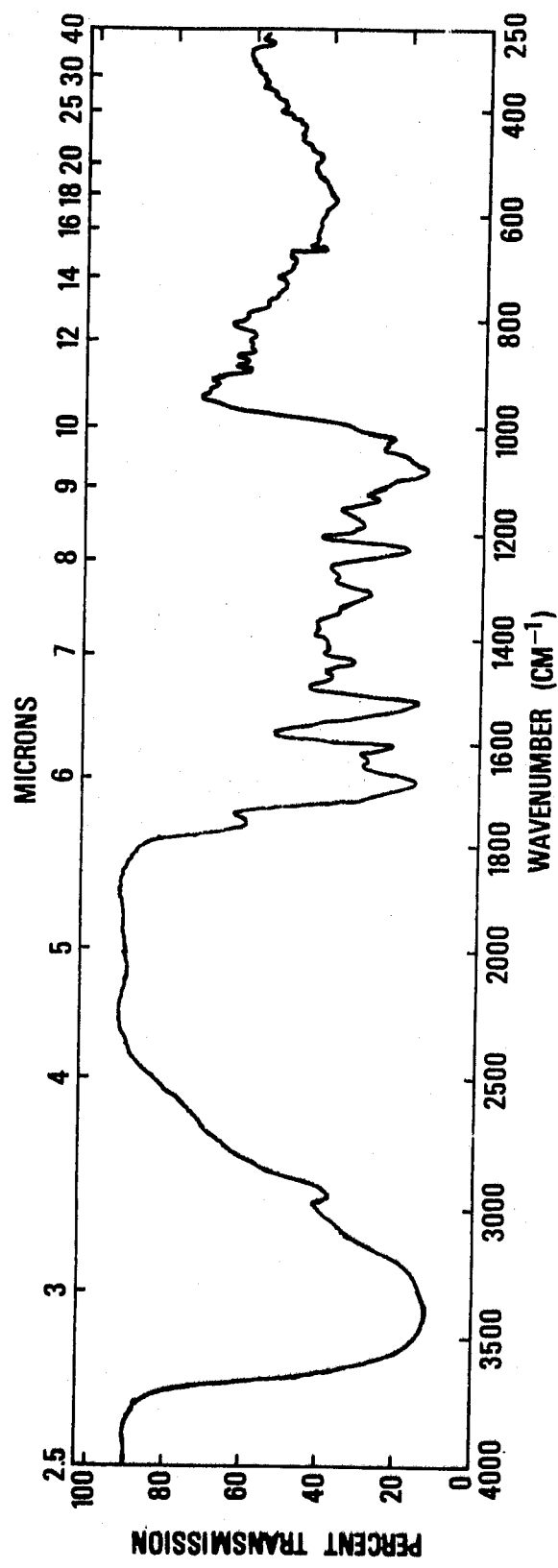
FIG. 2 — A-35512 factor B dihydrochloride

The infrared absorption spectrum of A-35512 factor B dihydrochloride in KBr pellet is shown in FIG. 2 of the accompanying drawings. The most significant absorption maxima occur at the following frequencies ($cm^{-1}$): 3420 (strong), 3300 (shoulder), 2950 (weak), 1752 (weak), 1675 (strong), 1630 (shoulder), 1605 (strong), 1520 (strong), 1470 (weak), 1440 (weak), 1410 (weak), 1345 (shoulder), 1312 (medium), 1225 (medium), 1180 (weak), 1135 (weak), 1080 (strong), and 1020 (weak).

Amino-acid analysis of acid-hydrolyzed A-35512 factor B dihydrochloride indicates that A-35512 factor B contains at least five amino-acid residues, one of which is glycine. The four remaining amino-acid residues in A-35512 factor B are complex and appear to be identical to those found in A-35512 factor A. The structure of one of these amino-acid residues appears to be:

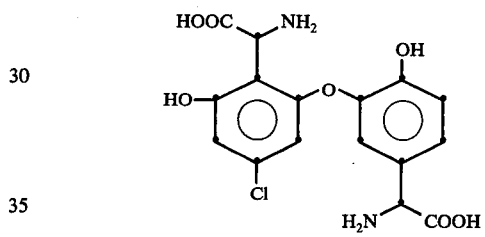

Analyses of its acid-hydrolysis products indicate that A-35512 factor B dihydrochloride contains the following sugars: glucose, fucose, mannose, rhamnose, and 3-amino-2,3,6-trideoxy-3-C-methyl-L-xylo-hex-opyranose. Mild acid hydrolysis of A-35512 factor B dihydrochloride removes the glucose, fucose, mannose, and rhamnose groups to give a characteristic aglycone derivative. This A-35512 factor B aglycone is the subject of a copending application of Manuel Debono, titled ANTIBIOTIC A-35512B AGLYCONE, Ser. No. 689,273, filed May 24, 1976, now U.S. Pat. No. 4,029,769.

A-35512 factor B dihydrochloride has at least one hydroxyl group capable of esterification.

A-35512 factor B dihydrochloride is soluble in water, is partially soluble in alcohols such as methanol and ethanol, and is insoluble in other less polar organic solvents, such as benzene, chloroform, acetone, diethyl ether, ethyl acetate, toluene, hexane, acetonitrile and dioxane.

A-35512 factor B dihydrochloride is stable for as much as 72 hours in aqueous solutions having a pH of from about 3 to about 10.

A-35512 Factor C

A-35512 factor C is a white, amorphous, basic compound.

A-35512 factor C has the following approximate percentage compositions:
Carbon, 53.93%; hydrogen, 5.15%;
nitrogen, 5.80%; oxygen, 32.35%;

chlorine, 1.90%.

This elemental composition is in agreement with a preferred empirical formula of $C_{84}H_{99}N_8O_{38}Cl$. A-35512 factor C has an approximate molecular weight of 1862.

A-35512 factor C dihydrochloride is a white amorphous compound. A-35512 factor C dihydrochloride has the following approximate percentage elemental composition:

Carbon, 51.76%; hydrogen, 5.07%;
nitrogen, 5.61%; oxygen, 30.29%;
chlorine, 4.88%.

The empirical formula for A-35512 factor C dihydrochloride is in the range of $C_{83-85}H_{97-101}N_8O_{37-39}Cl_3$.

The elemental composition is in particular agreement with another preferred empirical formula of $C_{84}H_{97}N_8O_{38}Cl \cdot 2HCl$ (Calcd.: C, 52.2%; H, 5.1%, N, 5.8%; O, 31.5%; Cl, 5.4%).

Figure 4:
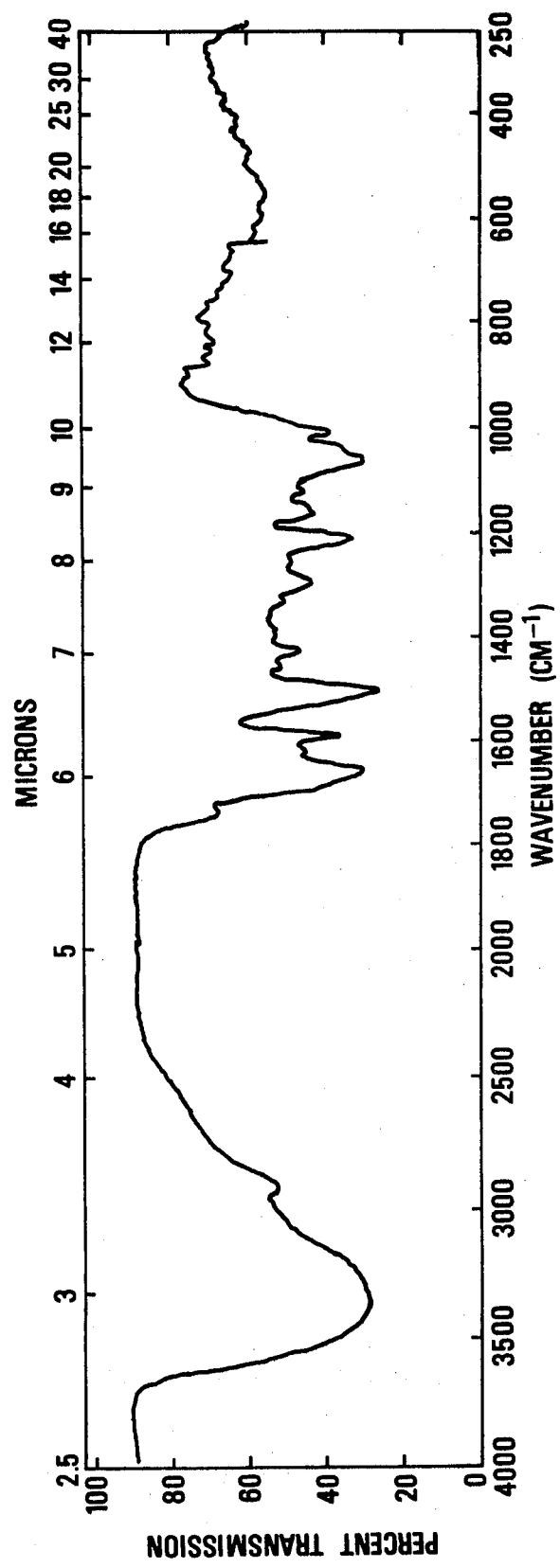
FIG. 4 — A-35512 factor C dihydrochloride

The infrared absorption spectrum of A-35512 factor C dihydrochloride in KBr pellet is shown in FIG. 4 of the accompanying drawings. The most significant absorption maxima occur at the following frequencies (cm$^{-1}$): 3370 (strong), 3280 (shoulder), 3040 (shoulder), 2980 (shoulder), 2920 (weak), 1740 (weak), 1658 (strong), 1620 (weak), 1589 (medium), 1503 (strong), 1460 (weak), 1428 (medium), 1385 (weak), 1330 (weak), 1295 (medium), 1210 (strong), 1162 (medium), 1120 (weak), 1060 (strong), and 1005 (medium).

The ultraviolet absorption spectra of A-35512 factor C dihydrochloride show, in acidic and neutral methanol, an absorption maximum at 282 nm ($\epsilon$ 14,600) and, in basic methanol, an absorption maximum at 292 nm ($\epsilon$ 16,400), calculated using a molecular weight of 2000.

A $^{13}C$ nuclear-magnetic-resonance spectrum of A-35512 factor C dihydrochloride in $D_2O$ has the following characteristics:

| No. | PPM | Height (%) |
| --- | --- | --- |
| 1 | 172.9 | 2.5 |
| 2 | 172.2 | 2.0 |
| 3 | 171.5 | 2.2 |
| 4 | 171.0 | 3.9 |
| 5 | 169.6 | 2.0 |
| 6 | 158.6 | 1.8 |
| 7 | 157.8 | 3.0 |
| 8 | 156.5 | 2.1 |
| 9 | 156.1 | 2.8 |
| 10 | 155.6 | 4.2 |
| 11 | 154.6 | 3.9 |
| 12 | 151.1 | 1.5 |
| 13 | 143.3 | 1.4 |
| 14 | 136.0 | 3.2 |
| 15 | 135.4 | 2.7 |
| 16 | 133.2 | 3.7 |
| 17 | 128.7 | 2.3 |
| 18 | 126.5 | 3.1 |
| 19 | 124.6 | 2.1 |
| 20 | 129.3 | 2.7 |
| 21 | 121.5 | 2.2 |
| 22 | 120.1 | 1.2 |
| 23 | 118.0 | 1.7 |
| 24 | 116.5 | 1.2 |
| 25 | 107.8 | 2.7 |
| 26 | 104.5 | 1.9 |
| 27 | 101.7 | 1.9 |
| 28 | 94.5 | 1.0 |
| 29 | 75.9 | 3.0 |
| 30 | 74.3 | 2.0 |
| 31 | 73.4 | 2.3 |
| 32 | 72.1 | 3.5 |
| 33 | 70.9 | 4.3 |
| 34 | 68.7 | 2.9 |
| 35 | 67.4 | 71.7* |
| 36 | 64.3 | 1.3 |
| 37 | 62.2 | 1.6 |
| 38 | 56.1 | 1.4 |
| 39 | 55.2 | 3.5 |
| 40 | 54.2 | 2.1 |
| 41 | 24.3 | 1.9 |
| 42 | 17.9 | 2.2 |
| 43 | 17.1 | 2.0 |
| 44 | 16.2 | 2.0 |

*dioxane standard

A-35512 factor C dihydrochloride has the following specific rotations:
$[\alpha]_D^{25}$ −161° (c 1.05, $H_2O$)
$[\alpha]_{365}^{25}$ −614° (c 1.05, $H_2O$).

Electrometric titration of A-35512 factor C dihydrochloride in 66 percent aqueous dimethylformamide indicates the presence of three titratable groups with pk$_a$ values of approximately 7.30, 8.92, and 10.99, and the possible presence of two or more groups with pk$_a$ values greater than 11.5.

The apparent molecular weight of A-35512 factor C dihydrochloride, as determined by titration, is about 1982.

Amino-acid analysis of acid-hydrolyzed A-35512 factor C dihydrochloride indicates that it contains at least five amino-acid residues, one of which appears to be glycine. The four remaining amino-acid residues have not yet been identified.

A-35512 factor C dihydrochloride is soluble in water, dimethyl sulfoxide, and aqueous dimethylformamide, is partially soluble in alcohols such as methanol and ethanol, and is insoluble in other less polar organic solvents, such as benzene, chloroform, acetone, diethyl ether, ethyl acetate, toluene, hexane, acetonitrile, and dioxane.

A-35512 factor C dihydrochloride is stable in aqueous solutions having a pH of from about 3 to about 10, for as long as 146 hours.

A-35512 Factor E

A-35512 factor E is a white, amorphous, basic compound. A-35512 factor E has the following approximate percentage elemental composition:

Carbon, 54.84%; hydrogen, 4.73%;
nitrogen, 5.26%; oxygen, 32.67%;
chlorine, 1.72%.

A-35512 factor E hydrochloride is a white amorphous compound. A-35512 factor E hydrochloride has the following approximate percentage elemental composition:

Carbon, 52.67%; hydrogen, 4.59%;
nitrogen, 5.55%; oxygen, 33.51%;
chlorine, 3.62%.

Figure 5:
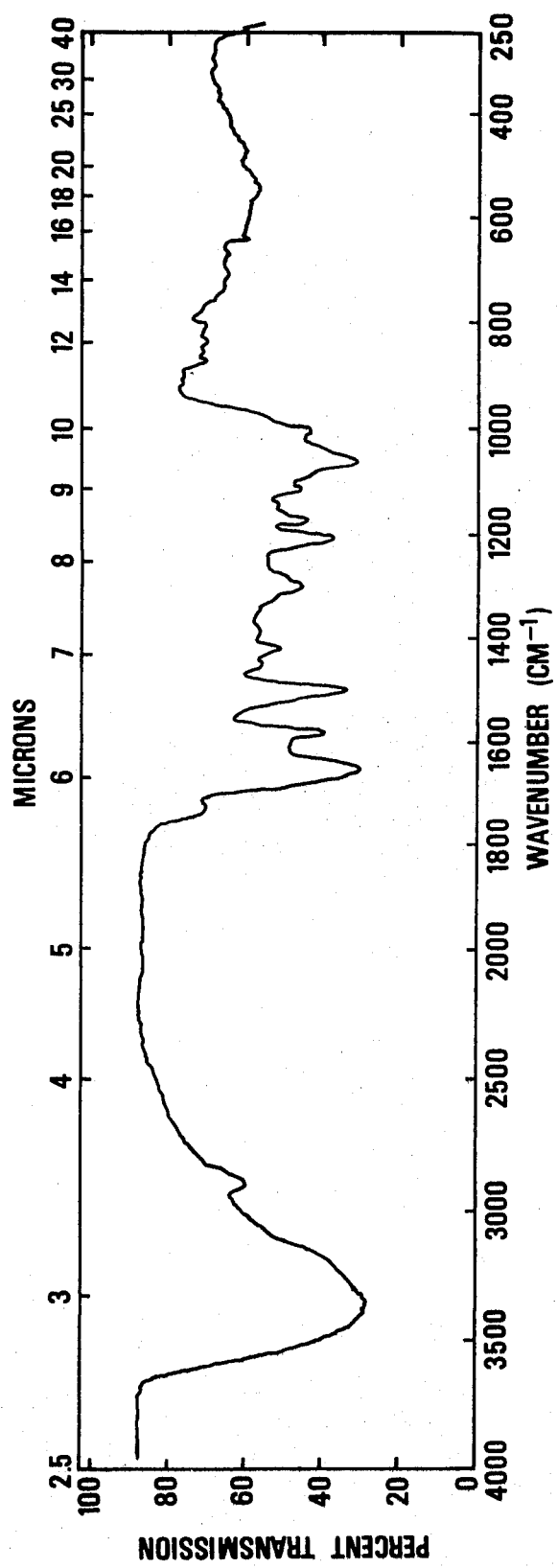
FIG. 5 — A-35512 factor E hydrochloride

The infrared absorption spectrum of A-35512 factor E hydrochloride in KBr pellet is shown in FIG. 5 of the accompanying drawings. The most significant absorption maxima occur at the following frequencies (cm$^{-1}$): 3360 (strong), 3220 (shoulder), 2900 (weak), 1725 (weak), 1650 (strong), 1580 (medium), 1498 (strong), 1450 (weak), 1419 (weak), 1295 (medium), 1205 (medium), 1172 (medium), 1110 (weak), 1060 (strong), and 1000 (weak).

The ultraviolet absorption spectra of A-35512 factor E hydrochloride exhibit the following absorption maxima: in neutral methanol, 270 nm (sh) and 359 nm ($\epsilon$ 16,216); in acidic methanol, 286 nm ($\epsilon$ 18,018) and 310 nm (sh); in basic methanol, 270 nm (sh), 300 nm ($\epsilon$ 16,216), and 354 nm ($\epsilon$ 17,568), calculated using a molecular weight of 2000.

A-35512 factor E hydrochloride has the following specific rotation: $[\alpha]_D^{25}$ −108.3 (c 1, $H_2O$).

Electrometric titration of A-35512 factor E hydrochloride in 66% aqueous dimethylformamide indicates the presence of three titratable groups with $pK_a$ values of approximately 6.30, 9.09, and 11.62, and the possible presence of one or two groups with $pK_a$ values of about 12.5 or greater (initial pH 5.45).

The apparent molecular weight of A-35512 factor E hydrochloride, as determined by titration, is approximately 2018.

Amino-acid analysis of acid-hydrolyzed A-35512 factor E hydrochloride indicates that A-35512 factor E contains six as-yet-unidentified amino-acid residues.

A-35512 factor E hydrochloride is soluble in water, is partially soluble in alcohols such as methanol and ethanol, but is insoluble in most organic solvents such as benzene, chloroform, acetone, diethyl ether, ethyl acetate, toluene, hexane, acetonitrile and dioxane.

A-35512 Factor H

A-35512 factor H is a white, amorphous, basic compound. A-35512 factor H has the following approximate percentage elemental composition:

Carbon, 53.76%; hydrogen, 5.32%; nitrogen, 5.53%; oxygen, 33.48%; chlorine, 1.59%.

A-35512 factor H has an empirical formula in the range of $C_{85-87}H_{103-107}N_8O_{38-40}Cl$, a preferred tentative empirical formula of $C_{86}H_{104}N_8O_{39}Cl$, and an approximate molecular weight of 1908.

A-35512 factor H hydrochloride is a white, amorphous, hygroscopic compound. A-35512 factor H hydrochloride has the following average percentage elemental composition:

Carbon, 53.10%; hydrogen, 5.37%; nitrogen, 5.35%; oxygen, 30.12%; chlorine, 3.78%.

Figure 3:
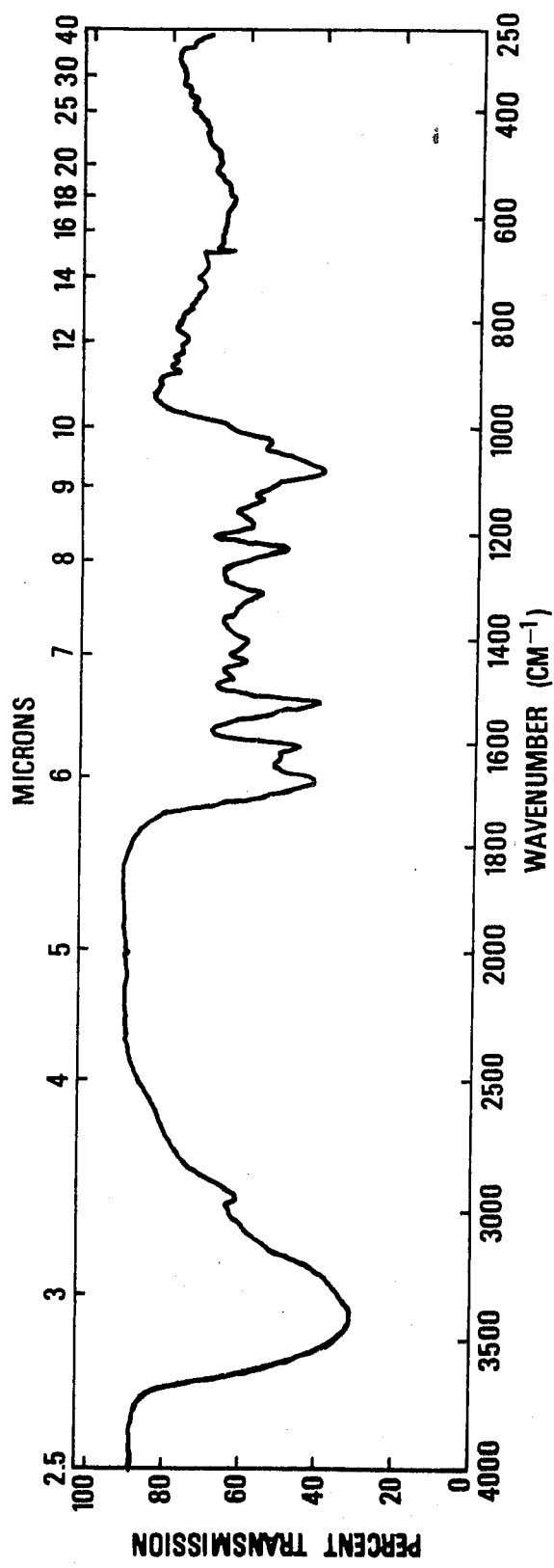
FIG. 3 — A-35512 factor H hydrochloride

The infrared absorption spectrum of A-35512 factor H hydrochloride in KBr pellet is shown in FIG. 3 of the accompanying drawings. The most significant absorption maxima occur at the following frequencies ($cm^{-1}$): 3410 (strong), 3240 (shoulder), 2940 (weak), 1670 (strong), 1630 (shoulder), 1605 (strong), 1520 (strong), 1470 (weak), 1442 (weak), 1400 (weak), 1345 (shoulder), 1310 (medium), 1225 (medium), 1180 (weak), 1135 (weak), 1080 (strong), and 1020 (shoulder).

The ultraviolet absorption spectra of A-35512 factor H hydrochloride show, in acidic and neutral methanol, an absorption maximum at 282 nm ($\epsilon$ 12,500) and, in basic methanol, an absorption maximum at 292 nm ($\epsilon$ 14,000), calculated using a molecular weight of 2000. The uv spectral of A-35512 factor H hydrochloride also show end absorption at 225 nm.

A $^{13}C$ nuclear-magnetic-resonance spectrum of A-35512 factor H hydrochloride in $D_2O$ has the following characteristics:

| No. | PPM | Height (%) |
|---|---|---|
| 2 | 177.2 | 2.7 |
| 3 | 171.6 | 5.2 |
| 4 | 170.9 | 5.8 |
| 5 | 169.6 | 4.7 |
| 6 | 158.9 | 3.1 |
| 7 | 157.6 | 4.3 |
| 8 | 156.6 | 3.8 |
| 9 | 155.6 | 4.1 |
| 10 | 155.4 | 3.8 |
| 11 | 154.3 | 2.4 |
| 12 | 151.3 | 1.6 |
| 13 | 137.7 | 2.0 |
| 14 | 136.7 | 2.2 |
| 15 | 136.0 | 4.0 |

-continued

| No. | PPM | Height (%) |
|---|---|---|
| 16 | 135.3 | 1.9 |
| 17 | 133.5 | 5.0 |
| 18 | 129.4 | 3.7 |
| 19 | 127.3 | 1.3 |
| 20 | 126.1 | 3.2 |
| 21 | 124.2 | 6.9 |
| 22 | 122.6 | 4.1 |
| 23 | 107.6 | 2.7 |
| 24 | 101.8 | 1.8 |
| 25 | 76.2 | 2.8 |
| 26 | 73.5 | 4.4 |
| 27 | 72.3 | 7.4 |
| 28 | 71.0 | 12.2 |
| 29 | 69.7 | 4.6 |
| 30 | 67.4 | 73.1* |
| 31 | 61.6 | 3.5 |
| 32 | 56.8 | 1.8 |
| 33 | 55.4 | 2.8 |
| 34 | 55.0 | 1.5 |
| 35 | 24.5 | 2.6 |
| 36 | 17.9 | 4.6 |
| 37 | 17.2 | 2.6 |
| 38 | 16.3 | 3.6 |

*dioxane standard

A-35512 factor H hydrochloride has the following specific rotation: $[\alpha]_D^{25}$ −123.5° (c 1, $H_2O$).

Electrometric titration of A-35512 factor H hydrochloride in 66 percent aqueous dimethylformamide indicates the presence of five titratable groups with $pK_a$ values of approximately 5.0, 7.46, 9.80, 11.43 and 13.02 (initial pH 5.93).

The apparent molecular weight of A-35512 factor H hydrochloride, as determined by titration, is approximately 1660.

Amino-acid analysis of acid-hydrolyzed A-35512 factor H hydrochloride indicates that A-35512 factor H contains at least five amino-acid residues, one of which is glycine. The four remaining amino-acid residues in A-35512 factor H appear to be identical to those found in A-35512 factors A and B.

A-35512 factor H hydrochloride is soluble in water, is partially soluble in alcohols such as methanol and ethanol, but is insoluble in most organic solvents such as benzene, chloroform, acetone, diethyl ether, ethyl acetate, toluene, hexane, acetonitrile and dioxane.

A-35512 factor H hydrochloride is stable for as much as 72 hours in aqueous solutions having a pH of from about 3 to about 10.

A-35512 factors A, B, C, E, and H and minor factors F and G are conveniently separated by paper chromatography using a 1-butanol:pyridine:acetic acid:water (15:10:3:12) solvent system. Bioautography, using *Sarcina lutea*, is a preferred detection method. The approximate $R_f$ values of the A-35512 factors in this system are given in Table I.

Table I

| A-35512 Factor | $R_f$ Value |
|---|---|
| Factor A . 2HCl | 0.21 |
| Factor B . 2HCl | 0.34 |
| Factor C . 2HCl | 0.46 |
| Factor E . HCl | 0.64 |
| Factor F | 0.81 |
| Factor G | 0.93 |
| Factor H . HCl | 0.15 |

In various systems A-35512 factor H has a chromatographic profile very similar to that of antibiotic AM374 (U.S. Pat. No. 3,700,768). Antibiotic A-35512 factor H can be distinguished from antibiotic AM374 in at least two paper-chromatographic systems. The $R_f$ values of A-35512 factor H.2HCl and AM374 in these two systems are given in Table II.

Table II

| Solvent System | $R_f$ Value | |
|---|---|---|
| | A35512H | AM234 |
| CH₃OH:0.1N HCl (3:1) | 0.47 | 0.58 |
| 1-propanol:NH₄OH:H₂O (6:3:1) | 0.11 | 0.20 |

Several of the A-35512 factors may be separated by high performance liquid chromatography (HPLC), using polyamide (ZIPAX, Dupont) as the stationary phase and a 1.33 molar aqueous monobasic potassium phosphate solution as the mobile phase, and detecting by uv (250 nm). In Table III are given the retention times for the A-35512 factors in a representative separation by HPLC, using the following conditions:
Column Size: ⅛ inch × 6 inches
Packing: polyamide (ZIPAX, DuPont)
Solvent: KH₂PO₄(327 g)/H₂O (1800 ml)
Flow Rate: 0.5 ml/min
Chart Speed: 2 inches/hr
Pressure: 1500 P.S.I.

Table III

| A-35512 Factor | Retention Time (minutes) |
|---|---|
| A | 9.375 |
| B | 13.125 |
| C | 26.25 |
| E | 5.625 |
| F | 7.5 |
| G | 7.5 |
| H | 7.5 |

In addition to the free base and hydrochloride forms of the individual A-35512 factors, other pharmaceutically-acceptable acid-addition salts of A-35512 factors A, B, C, E, and H are also part of this invention. "Pharmaceutically-acceptable" salts are salts in which the toxicity of the compound as a whole toward warm-blooded animals is not increased relative to the non-salt form. Representative and suitable salts of A-35512 factors A, B, C, E, and H include those salts formed by standard reaction with both organic and inorganic acids such as, for example, sulfuric, phosphoric, acetic, succinic, citric, lactic, maleic, fumaric, palmitic, cholic, pamoic, mucic, D-glutamic, d-camphoric, glutaric, glycolic, phthalic, tartaric, lauric, stearic, salicylic, methanesulfonic, benzenesulfonic, sorbic, picric, benzoic, cinnamic and like acids.

The novel antibiotics of this invention are produced by culturing an A-35512-producing strain of *Streptomyces candidus* under submerged aerobic conditions in a suitable culture medium until substantial antibiotic activity is produced. The antibiotics are recovered by employing various isolation and purification procedures used in the fermentation art.

The new organism useful for the preparation of A-35512 antibiotics was isolated from a soil sample collected on Eniwetok Atoll. This organism is classified as a novel strain of *Streptomyces candidus* (Krassilnikov) Waksman, as described by E. B. Shirling and D. Gottlieb in "Cooperative Description of Type Cultures of Streptomyces. II. Species Descriptions from Second Study," Intern. J. Systematic Bacteriol, 18(4):279-392 (1968); and S. A. Waksman, "The Actinomycetes. Vol. 2. Classification, Identification, and Descriptions of Genera and Species," Williams and Wilkins Co., Baltimore, 1961.

This classification is based on methods recommended for the International Streptomyces Project [E. B. Shirling and D. Gottlieb, "Methods for Characterization of Streptomyces Species," Intern. Bull. Systematic Bacteriol. 16: 313-340 (1966)] along with certain supplementary tests. Color names were assigned according to the ISCC-NBS method (K. L. Kelly and D. B. Judd, "The ISCC-NBS Method of Determining Colors and a Dictionary of Color Names," U.S. Department of Commerce Cir. 553, Washington, D.C. 1955). Figures in parentheses refer to the Tresner and Backus color series [H. D. Tresner and S. J. Backus, "System of Color Wheels for Streptomycete Taxonomy," Appl. Microbiol. 11:355-338 (1963)] and color tab designations are underlined. The Maerz and Paul color blocks (A. Maerz and M. R. Paul, "Dictionary of Color," McGraw-Hill, New York, N.Y., 1950) are enclosed in brackets. Cultures were grown at 30° C. for 14 days unless otherwise noted.

CHARACTERIZATION OF A-35512-PRODUCING STRAIN

Morphology

Long, wavy sporophores are produced. Spores, which occur in chains of 10-50, are cylindrical and measure from 0.7 to 1.05μ × 1.4 to 3.5μ. Sclerotia-like structures are produced on several media. Broom-shaped or fascicled hyphae were also observed occasionally. The spore surface, as observed by electron microscopy, is smooth.

| Cultural Characteristis on Various Media | |
|---|---|
| Medium | Characteristics |
| ISP No. 2 (yeast extract-malt extract agar) | Growth-abundant; reverse grayish yellow [11J5]; abundant aerial mycelium and sporulation, white (w) a; no soluble pigment. |
| ISP No. 3 (oatmeal agar) | Growth-moderate; reverse pale yellow green [10B1]; fiar aerial mycelium and sporulation, white (w) 13ba; no soluble pigment; sclerotia-like bodies observed. |
| ISP No. 4 (inorganic salts-starch agar) | Growth-good; reverse amber white [10C1]; good aerial mycelium and sporulation, yellowish gray (GY) 2dc; slight brown soluble pigment; sclerotia-like bodies observed. |
| ISP No. 5 (glycerol asparagine agar) | Growth-good; reverse pale yellow green [10B2]; good aerial mycelium and sporulation, white (w) a; no soluble pigment; mycelium appears to be facicled. |
| Emerson's agar | Growth-good; reverse light olive [14B6]; no aerial mycelium or sporulation; slight brown soluble pigment. |
| Bennett's modified agar | Growth-abundant; reverse moderate yellow [11J6]; abundant aerial mycelium and sporulation, white (w) a; no soluble pigment. |
| Czapek's-solution agar | Growth-good; reverse pale yellow green [10B1]; good aerial mycelium and sporulation, white (w) b; no soluble pigment; mycelium appears fascicled. |
| Tomato-paste oatmeal agar | Growth-abundant; reverse grayish yellow [11I5]; abundant aerial mycelium and sporulation, white (w) a; mycelium "rolls up" away from agar surface; no soluble pigment. |
| Nutrient agar | Growth-fair to good; reverse pale yellow green [18D2]; good aerial mycelium and sporulation, white (w) a; slight brown soluble pigment. |
| Glucose asparagine agar | Growth-good; reverse pale yellow green [17E1]; good aerial mycelium and sporulation, white (w) 13ba; no soluble pigment. |

-continued

Cultural Characteristis on Various Media

| Medium | Characteristics |
|---|---|
| Tryptone yeast-extract agar | Growth-fair; reverse white [10A1]; fair aerial mycelium and sporulation, white (w) b; no soluble pigment. |
| Tyrosine agar | Growth-good, reverse white [10B2]; good aerial mycelium and sporulation, white (w) a; brown soluble pigment; sclerotia-like bodies observed. |
| Glycerol glycine agar | Growth-good; reverse white [10B2]; good aerial mycelium and sporulation, white (w) b; slight brown soluble pigment. |
| Calcium malate agar | Growth-good; reverse white [10B1]; good aerial mycelium and sporulation, white (w) a; no soluble pigment; medium cleared around area of inoculum. |

The organism was studied for selected physiological properties in accordance with standard procedures. The properties observes and characteristics found were as follows:

| Property Observed | Characteristics |
|---|---|
| Action on milk | Coagulation with some clearing at 14 days. |
| Nitrate reduction | Positive |
| Melanin-pigment production on: | |
| Peptone iron agar slants | Negative |
| Tyrosine agar slants | Weak Positive (pigment after 7 days) |
| Tryptone yeast extract broth | Negative |
| Gelatin liquefaction | Complete at 14 days |
| Temperature requirements: | 26–30° C.-good growth and sporulation |
| (ISP medium No. 2: yeast-extract malt-extract slants) | 37° C.-sparse growth; no aerial mycelium or spores |
| | 40° C.-slight vegetative growth only |
| | 45° C.-no growth |

The results of carbon utilization tests carried out with organism NRRL 8156 are set forth below. The symbols used to indicate growth response are:
+ = good growth, positive utilization
(+) = poor to fair growth
(−) = faint growth, probably no utilization
− = no growth, no utilization

| Carbon Source | |
|---|---|
| none (negative control) | (−) |
| D-glucose (positive control) | + |
| L-arabinose | (−) |
| sucrose | (−) |
| i-inositol | + |
| D-mannitol | + |
| D-fructose | + |
| rhamnose | (−) |
| raffinose | (−) |
| D-xylose | (+) |

Certain characteristics of the A-35512-producing *S. candidus* NRRL 8156 strain differ from the characteristics of the organism described by Shirling and Gottlieb [Elwood B. Shirling and David Gottlieb, "Cooperative Description of Type Cultures of *Streptomyces* III. Additional Species Descriptions from First and Second Studies," *Intern. J. Systematic Bacteriol.* 18(2), 69–189 (1968)] and by Waksman [S. A. Waksman, "The Actinomycetes. Classification, Identification and Descriptions of Genera and Species," Vol. 2, The Williams and Wilkins Co., Baltimore, Md., 1961]. These differences are summarized in Table IV:

Table IV

| | NRRL 8156 | Published Description |
|---|---|---|
| Carbon Utilization | | |
| L-arabinose | − | + |
| rhamnose | − | + |
| 1-inositol | + | − |
| Gelatin Liquefaction | Complete at 14 days | Slow |
| Action on Milk | Coagulation; some clearing at 14 days | No coagulation; good peptonization |

The *Streptomyces candidus* culture useful for the production of A-35512 antibiotics has been deposited and made a part of the stock culture collection of the Northern Regional Research Center, U.S. Department of Agriculture, Agricultural Research Service, Peoria, Illinois, 61604, from which it is available to the public under the number NRRL 8156.

As in the case with other organisms, the characteristics of the A-35512-producing culture, *Streptomyces candidus* NRRL 8156, are subject to variation. For example, artificial variants and mutants of the NRRL 8156 strain may be obtained by treatment with various known mutagens such as ultraviolet rays, X-rays, high-frequency waves, radioactive rays and chemicals. All natural and artificial variants and mutants which belong to *Streptomyces candidus* and produce the A-35512 antibiotics may be used in this invention.

The culture medium employed to grow *Streptomyces candidus* NRRL 8156 can be any one of a number of media. For economy in production, optimal yield, and ease of product isolation, however, certain culture media are preferred. Thus, for example, a preferred carbohydrate source in large-scale fermentation is sucrose, although glucose, tapioca dextrin, fructose, mannitol, maltose, lactose, and the like can also be employed. A preferred nitrogen source is soluble meat peptone, although soybean flour, pork-blood meal, amino acids such as glutamic acid, and the like are also useful. Among the nutrient inorganic salts which can be incorporated in the culture media are the customary soluble salts capable of yielding zinc, sodium, magnesium, calcium, ammonium, chloride, carbonate, sulfate, nitrate and like ions.

Essential trace elements necessary for the growth and development of the organism should also be included in the culture medium. Such trace elements commonly occur as impurities in other constituents of the medium in amounts sufficient to meet the growth requirements of the organism.

It may be necessary to add small amounts (i.e. 0.2 ml/l.) of an antifoam agent such as polypropylene glycol to large-scale fermentation media if foaming becomes a problem.

For production of substantial quantities of the A-35512 antibiotics, submerged aerobic fermentation in tanks is preferred. Small quantities of the A-35512 antibiotics may be obtained by shake-flask culture. Because of the time lag in antibiotic production commonly associated with inoculation of large tanks with the spore form of the organism, it is preferable to use a vegetative inoculum. The vegetative inoculum is prepared by inoculating a small volume of culture medium with the spore form or mycelial fragments of the organism to obtain a fresh, actively growing culture of the organism. The vegetative inoculum is then transferred to a larger tank.

The A-35512-producing organism can be grown at temperatures between about 20° and about 40° C. Optimum A-35512 production appears to occur at temperatures of about 30°-34° C.

As is customary in aerobic submerged culture processes, sterile air is blown through the culture medium. For efficient growth of the organism the volume of air employed in tank production is preferably above 0.1 volume of air per volume of culture medium per minute (V/V/M). For efficient production of the A-35512 antibiotics the volume of air employed in tank production is preferably about 0.25 V/V/M.

Production of the A-35512 antibiotics can be followed during fermentation by testing samples of the broth or of extracts of the mycelial solids for antibiotic activity against organisms known to be sensitive to the antibiotics. One assay organism useful in testing these antibiotics is *Bacillus subtilis* ATCC 6633. The bioassay is preferably performed by paper-disc assay on agar plates containing a nutritionally-limited medium.

Following their production under submerged aerobic fermentation conditions, the A-35512 antibiotics can be recovered from the fermentation medium by methods employed in the fermentation art. The antibiotic activity produced during fermentation of an A-35512-producing organism generally occurs in the filtered broth. Maximum recovery of the A-35512 antibiotics is accomplished, therefore, by an initial filtration to remove the mycelial mass. The filtered broth can be purified to give the A-35512 complex by a variety of techniques. A preferred technique involves adsorption of the filtered broth on a polyamide column and elution of the column with water and aqueous alcohol mixtures. The eluted fractions which exhibit antibiotic activity can be combined to give the A-35512 complex. Alternatively, using this technique, the eluted fractions can be combined on the basis of thin-layer-chromatographic behavior to give purified A-35512 factor B and enriched mixtures of the other A-35512 factors.

Further purification of the individual A-35512 factors includes additional adsorption and extraction procedures. Adsorptive materials such as alumina, silica gel, ion-exchange resins and the like can be advantageously used.

The A-35512 factors occur in the fermentation broth as hydrochlorides. The preferred polyamide separation procedure provides A-35512 factor B and the remaining portion of the A-35512 complex as hydrochlorides. Each individual factor may be converted to its free base (ionic-chlorine free) form by accepted procedures such as, for example, chromatography over a weakly-basic ion-exchange resin.

Alternatively, the culture solids, including medium constituents and mycelium can be used without extraction or separation, but preferably after removal of water, as a source of the A-35512 antibiotics. For example, after production of A-35512 antibiotic activity, the culture medium can be dried by lyophilization and mixed directly into feed premix.

The A-35512 antibiotic complex and individual A-35512 antibiotic factors A, B, C, E, and H inhibit the growth of certain pathogenic organisms, particularly gram-positive bacteria. The minimal inhibitory concentrations (MIC's) at which the A-35512 factors A, B, C and H inhibit selected bacteria, as determined by standard agar-dilution tests, are summarized in Table V.

Table V

| | MIC (mcg/ml) | | | |
|---|---|---|---|---|
| Test Organism | A-35512 factor A . 2HCl | A-35512 factor B . 2HCl | A-35512 factor C . 2HCl | A-35512 factor H . HCl |
| *Staphylococcus aureus* 3055 | 6.25 | 3.12 | 6.25 | 25.0 |
| *Staphylococcus aureus* 3074 | 25.0 | 6.25 | 6.25 | 25.0 |
| *Streptococcus faecalis* | 6.25 | 3.12 | 3.12 | 12.5 |

In one important aspect, the A-35512 antibiotics inhibit the growth of organisms which are resistant to other antibiotics. In Table VI is summarized the standard-disc-plate-assay activity of A-35512 factors A, B, C, E, and H (30 mcg/disc) against representative organisms. Activity is measured as the diameter (in mm) of the observed zones of inhibition.

Table VI

| | Zone Diameters (mm) | | | | |
|---|---|---|---|---|---|
| Test Organism | A-35512 factor A . 2HCl | A-35512 factor B . 2HCl | A-35512 factor C . 2HCl | A-35512 factor E . HCl | A-35512 factor H . HCl |
| *Staphylococcus aureus* 3055 (penicillin G susceptible) | 13.4 | 18.4 | 0 | 14.4 | 11.9 |
| *Staphylococcus aureus* 3074 (penicillin G resistant) | 13.2 | 16.8 | 0 | 14.5 | 11.6 |
| *Staphylococcus aureus* 3130 (methicillin resistant) | 14.4 | 18.4 | 0 | 15.4 | 12.6 |
| *Streptococcus pyogenes* (Group A) | 17.0 | 19.6 | 10.5 | 17.0 | 16.0 |
| *Streptococcus sp.* 9960 (Group D) | 15.5 | 19.4 | 0 | 16.4 | 13.8 |
| *Diplococcus pneumoniae* Park I | — | — | 11.0 | 20.0 | — |

Table VII gives additional agar-dilution test results for A-35512 factor B dihydrochloride, giving the minimal inhibitory concentrations (MIC) against several Group A Streptococci and Diplococci pneumonia.

Table VII

| Test Organism | | MIC (mcg/ml) A-35512 factor B |
|---|---|---|
| *Streptococcus pyogenes* | C203 | 1 |
| " | 10389 | 1 |
| " | 12344 | 8 |
| " | 12961 | 1 |

Table VII-continued

| Test Organism | | MIC (mcg/ml) A-35512 factor B |
|---|---|---|
| " | 663-72 | 0.5 |
| " | 664-72 | 0.5 |
| " | 665-72 | 1 |
| " | 13234 | 0.5 |
| " | 19035 | 0.5 |
| " | M6517 | 0.5 |
| " | D27781 | 1 |
| Diplococcus pneumoniae | Park I | 2 |
| " | Type 14 | 2 |

Table VIII gives additional agar-dilution test results for A-35512 factor B dihydrochloride against several Group D Streptococci.

Table VIII

| Test Organism | | MIC (mcg/ml) A-35512 factor B |
|---|---|---|
| Streptococcus sp. | D282 | 2 |
| " | 9901 | 2 |
| " | 9913 | 4 |
| " | 9933 | 4 |
| " | 9960 | 4 |
| " | 12253F | 4 |
| " | Shrigley | 4 |
| " | Mitis | 4 |
| " | 238 | 2 |
| " | SS992 | 4 |

Table IX provides additional agar-dilution test results for A-35512 factor B dihydrochloride against other gram-positive organisms.

Table IX

| Test Organism | | MIC (mcg/ml) A-35512 factor B |
|---|---|---|
| Staphylococcus aureus | 3123* | 4 |
| " | H43** | 4 |
| " | 3124** | 4 |
| " | 3126** | 2 |
| " | 3127** | 4 |
| " | H57** | 2 |
| " | 3074** | 4 |
| " | 3130*** | 4 |
| " | 3131**** | 4 |
| " | 3133*** | 2 |
| " | 3136*** | 2 |
| " | 3125*** | 4 |
| Staphylococcus epidermis | 3064** | 2 |
| " | 3078* | 2 |
| Bacillus subtilis ATCC 6633 | | 2 |
| Sarcina lutea PCI-1001-FDA | | 1 |

*penicillin-G susceptible
**penicillin-G resistant
***penicillin-G resistant; methicillin resistant
****penicillin-G resistant; methicillin resistant; clindamycin resistant The A-35512 antibiotics also inhibit the growth of certain anaerobic bacteria. Table X summarizes the activity of A-35512 factor B dihydrochloride against various anaerobic bacteria, using the standard agar-dilution test.

Table X

| Test Organism | MIC (mcg/ml) A-35512 factor B |
|---|---|
| Actinomyces israelii | 0.5 |
| Clostridium perfringens | 2.0 |
| Clostridium septicum | 4.0 |
| Eubacterium aerofaciens | 2.0 |
| Peptococcus asaccharolyticus | 1.0 |
| Peptococcus prevoti | 2.0 |
| Peptostreptococcus anaerobius | 1.0 |
| Peptostreptococcus intermedius | 4.0 |
| Propionibacterium acnes | 0.5 |
| Bacteroides fragilis ssp. fragilis 111 | 64.0 |
| Fusobacterium necrophorum | 8.0 |

Antibiotic A-35512 factor B dihydrochloride has shown in vivo antimicrobial activity against experimental bacterial infections. When two subcutaneous doses of A-35512 factor B were administered to mice in illustrative infections, the activity observed was measured as an $ED_{50}$ value [effective dose in mg/kg to protect 50 percent of the test animals; see Warren Wick, et al., J. Bacteriol. 81, 233-235 (1961)]. The $ED_{50}$ values observed for A-35512 factor B dihydrochloride are given in Table XI.

Table XI

| Test Organism | $ED_{50}$ | Infecting Challenge |
|---|---|---|
| Streptococcus pyogenes C203 | 1.75 | 260 × $LD_{50}$(ip) |
| Dipolococcus pneumoniae Park I | 4.3 | 60.8 × $LD_{50}$(ip) |
| Staphylococcus aureus 3055 | 6.9 | 206 × $LD_{50}$(ip) |

A-35512 factor B dihydrochloride also provided protection to guinea pigs which had been infected with the anaerobe Clostridium chauvoei (the disease agent of Black Leg in the bovine). These tests were carried out according to the U.S.D.A. Supplemental Assay Method for Potency Testing Clostridium chauvoei-containing Products (SAM 200, U.S. Department of Agriculture, Animal and Plant Health Inspection Service, Veterinary Services Laboratories, Ames, Iowa 50010, April 7, 1975, under 9 C.F.R. 113.91). The test results are given in Table XII.

Table XII

| Treatment | Challenge Dead/Total | Percent Protected |
|---|---|---|
| A-35512 Factor B 10 mg/kg* | 0/10 | 100 |
| A-35512 Factor B 1 mg/kg* | 3/10 | 70 |
| Challenge Control | 10/10 | 0 |

*Intramuscular administration

The A-35512 antibiotics are relatively nontoxic. For example, the $LD_0$ of A-35512 factor A dihydrochloride, when given subcutaneously to fasted Cox and Harlan female ICR mice, is greater than 8000 mg/kg. The $LD_{50}$ of A-35512 factor B dihydrochloride in mice, when given by intraperitoneal injection, is approximately 1356 mg/kg and, when given intravenously, is >1000<1250 mg/kg. Both A-35512 factor C dihydrochloride and A-35512 factor E hydrochloride have an acute toxicity, when given intraperitoneally to mice, which is greater than 300 mg/kg.

Another important property of the A-35512 complex and compounds is the ability to improve feed-utilization efficiency in animals. This ability has been demonstrated in ruminants which have a developed rumen function.

It is known that the efficiency of carbohydrate utilization in ruminants is increased by treatments which stimulate the animals' rumen flora to produce propionate compounds rather than acetate or butyrate compounds (for a more complete discussion, see Church et al. in "Digestive Physiology and Nutrition of Ruminants," Vol. 2, 1971, pp. 622 and 625).

The efficiency of feed use can be measured by in vivo tests in fistulated cattle, using the method described by Arthur P Raun in U.S. Pat. No. 3,794,732 (see especially Example 8). Table XIII summarizes the results of such a test with A-35512 factor B dihydrochloride wherein molar percent ruminal propionic acid concentrations were averaged over five analyses in a 21-day treatment period.

Table XIII

| Treatment | No. Animals | Average Molar Percent Propionic Acid | Molar Percent Increase over Control |
|---|---|---|---|
| Control | 5 | 19.3 | — |
| A-35512 factor B 50 g/ton | 5 | 26.0 | 6.7 |

The A-35512 complex and compounds are typically effective in increasing propionates and, thereby, the efficiency of feed utilization when administered to ruminants orally at rates of from about 0.15 to about 10.0 mg/kg/day. Most beneficial results are achieved at rates of from about 1.0 to about 2.0 mg/kg/day. A preferred method of administration of the A-35512 complex or compound is by mixing it with the animals' feed; however, it can be administered in other ways, for example, tablets, drenches, boluses or capsules. Formulation of these various dosage forms can be accomplished by methods well known in the veterinary pharmaceutical art. Each individual dosage unit would contain a quantity of A-35512 complex or compound directly related to the proper daily dose for the animal to be treated.

The A-35512 complex and compounds are also useful as growth-promoting agents in animals. In test using broiler chicks, A-35512 factor B dihydrochloride added to the feed at a rate of 20 grams per ton improved weight gains and increased feed efficiency. Table XIV summarizes the results of such tests in a battery study using four replicates of eight birds for each of two time replicates.

Table XIV

| Treatment | Conc. (g/ton) | Weight Gain (g) | % Improvement over Control | Feed Efficiency | % Improvement over Control |
|---|---|---|---|---|---|
| Control | — | 380 | — | 1.850 | — |
| A-35512 Factor B | 20 | 394 | 3.68 | 1.776 | 4.00 |

Table XV summarizes the results of such tests in a floor-pen study using twelve replicates of 80 birds each.

Table XV

| Treatment | Conc. (g/ton) | Weight Gain (g) | % Improvement over Control | Feed Efficiency | % Improvement over Control |
|---|---|---|---|---|---|
| Control | — | 1898 | — | 2.250 | — |
| A-35512 Factor B | 20 | 1956* | 3.06 | 2.177* | 2.81 |

*p≦0.05

The A-35512 complex and compounds are typically effective in promoting growth in poultry when administered with the anmals' feed at rates of from about one to about 100 grams of A-35512 complex or compound per ton of animal feed.

In order to illustrate more fully the operation of this invention, the following examples are provided.

EXAMPLE 1

A. Shake-flask Fermentation of A-35512

A lyophilized pellet of *Streptomyces candidus* NRRL 8156 was dissolved in 1-2 ml of sterilized water. This solution was used to inoculate a Bacto yeast malt extract (ISP No. 2, Difco laboratories, Detroit, Michigan) agar slant.

The inoculated slant was incubated at 30° C. for about seven days. The mature slant culture was covered with water (2 ml) and scraped with a sterile pipette to loosen the spores. A portion (0.1 ml) of this water suspension of spores was used to inoculate another ISP No. 2 agar slant. This inoculated slant was incubated at 30° C. for about seven days. The mature slant culture was covered with water (5 ml) and scraped with a sterile pipette to loosen the spores. A portion (2.5 ml) of the resulting suspension of spores was used to inoculate 50 ml of a vegetative medium having the following composition:

| Ingredient | Amount |
|---|---|
| Trypticase Soy Broth (Baltimore Biological Laboratories, Cockeysville, Md.) | 30 g |
| Water (deionized) | q.s. 1 liter |

The inoculated vegetative medium was incubated in a 250-ml Erlenmeyer flask at 30° C. for 48 hours on a shaker rotating through an arc two inches in diameter at 250 rpm.

This incubated vegetative medium (0.5 ml) was used to inoculate 50 ml of a production medium having the following composition:

| Ingredient | Amount (g/l.) |
|---|---|
| Tapioca dextrin | 25.0 |
| Glucose | 10.0 |
| $NH_4NO_3$ | 2.5 |
| KCl | 1.5 |
| $MgSO_4$ | 1.1 |
| $FeCl_2 \cdot 4H_2O$ | .03 |
| $ZnCl_2$ | .03 |
| $KH_2PO_4$ | 0.1 |
| L-Glutamic acid | 1.0 |
| DL-citrulline | 0.1 |
| $CaCO_3$ | 5.0 |
| Deionized water | q.s. 1 liter |

The inoculated production medium was incubated in a 250-ml Erlenmeyer flask at 32° C. for 8-10 days on a shaker rotating through an arc two inches in diameter at 250 rpm.

B. Tank Fermentation of A-35512

In order to provide a larger volume of inoculum, 20 ml of incubated vegetative medium prepared as described above was used to inoculate 400 ml of a second-stage vegetative growth medium having the same composition as that of the vegetative medium. This second-stage medium was incubated in a 2-liter flask for 24 hours at 32° C. on a shaker rotating through an arc 2 inches in diameter at 250 rpm.

Incubated second-stage vegetative medium (800 ml) thus prepared was used to inoculate 100 liters of sterile production medium. The inoculated production medium was allowed to ferment in a 165-liter fermentation tank for about 8–10 days at a temperature of 32° C. The fermentation medium was aerated with sterile air at the rate of 0.25 V/V/M and was stirred with conventional agitators at 200 rpm.

EXAMPLE 2

Vegetative medium prepared as described in Example 1, Section A, is conveniently maintained in liquid nitrogen by the following procedure:

In a small (13- × 100-mm) sterilized screw-cap tube is placed 2 ml of a suspension agent having the following composition:

| Ingredient | Amount |
| --- | --- |
| Glycerol | 20% |
| Lactose | 10% |
| Water (deionized) | 70% |

To this suspension agent is added 2 ml of a 48-hour-incubated vegetative medium prepared as above-described. The mixed solution is frozen and maintained in the gas phase of a liquid-nitrogen tank.

Vegetative medium thus stored is thawed for use in shake or tank fermentation by placing the vial in a 43° C. water bath. A portion of the thawed solution (1 ml) in the vial is used to inoculate 50 ml of a vegetative medium having the same composition as that described in Example 1, Section A. The inoculated vegetative medium is used, as described in Example 1, either for shake-flask fermentation or to provide a larger inoculum for tank fermentation.

EXAMPLE 3

The fermentation is carried out according to the method of Example 1, but using a shake-flask/tank production medium having the following composition:

| Ingredient | Amount (g/l.) |
| --- | --- |
| Tapioca dextrin | 75.0 |
| Molasses | 40.0 |
| Soluble meat peptone | 15.0 |
| $MgSO_4 \cdot 7H_2O$ | 0.5 |
| $CaCO_3$ | 2.0 |
| Water | q.s. 1 liter |

EXAMPLE 4

Separation of A-35512 Antibiotic Complex

Whole fermentation broth (250 gal.), obtained as described in Example 1, was filtered, using a filter aid (Hyflo Super-cel, a diatomaceous earth, Johns-Manville Products Corp.) at broth pH (pH 6.8-7.2). The clear filtrate thus obtained was passed through a column containing 10 ml of polymeric adsorbent (Amberlite XAD-4, Rohm and Haas Co.) per 100 ml of broth filtrate at a rate of 150 ml per minute. The fractions thus obtained were monitored for biological activity using a standard disc assay against *Sarcina lutea*. The biologically inactive effluent was discarded. The column was washed with water (⅓ of the broth volume) at a rate of 150 ml per minute. The inactive water wash was discarded.

The column was then eluted with a 50 percent aqueous methanol solution (600 liters) at a rate of 200 ml per minute. The eluate, containing the A-35512 antibiotic complex, was concentrated under vacuum to a volume of 15 liters, containing about 200 grams of A-35512 antibiotic complex per liter.

EXAMPLE 5

Separation of Factors from A-35512 Antibiotic Complex

The A-35512 antibiotic complex (about 3000 grams dissolved in 15 liters of methanol), obtained as described in Example 4, was chromatographed on a polyamide column (Woelm, 100 liter). The column was eluted with deionized water at a flow rate of about 80-120 ml per minute.

Fractions were monitored using cellulose thinlayer chromatography or paper chromatography, n-butanol:pyridine:acetic acid:water (15:10:3:12) solvent system, and *Sarcina lutea* bioautography.

The first 100 liters of eluate were discarded. The flow rate was then changed to about 160-200 ml per minute, and 12-liter fractions were collected. Twenty fractions were collected in this manner.

At this point the eluting solvent was changed to a water-methanol gradient using the following procedure:

A container holding 360 liters of methanol was siphoned into a container holding 120 liters of water. In the water container the mixing solution was stirred and fed into the column. Twenty-four fractions (24 liters each) were collected at a flow rate of 200-300 ml/minute.

On the basis of bioautography results, groups of fractions were combined and evaporated to dryness under vacuum to give A-35512 factor B dihydrochloride and the following enriched mixtures of factors:

| Fractions | Vol. (liters) | Factor(s) | Weight |
| --- | --- | --- | --- |
| 1–10 | 120 | A+H | 192 g. |
| 11–24 | 216 | B | 269 g. |
| 25–31 | 168 | B+C | 590 g. |
| 32–44 | 312 | C,E,F,G | 224 g. |

EXAMPLE 6

Purification of A-35512 Factor B

Partially purified A-35512 factor B dihydrochloride (400 g.), obtained as described in Example 5, was dissolved in 1.2 liters of 50 percent aqueous methanol and chromatographed on an alumina column prepared as follows:

Acidic aluminum oxide (10 kg., M. Woelm) was stirred in a 50 percent aqueous methanol solution. After allowing the mixture to stand, the supernatant solution was decanted and discarded. The alumina was again stirred with 50 percent aqueous methanol and packed into a column having a diameter of 13.5 om. The alumina column was washed with 50 percent aqueous methanol until a clear effluent was obtained. The column was eluted with 50 percent aqueous methanol at a flow rate of about 8-10 ml/minute, collecting fractions having a volume of about 240-300 ml. Fractions were monitored by thin-layer bioautography as described in Example 5. On the basis of this data, ffractions were combined and yielded purified A-35512 factor B dihydrochloride as follows:

| Fractions | Weight |
| --- | --- |
| 17–21 | 9.6 g. |
| 22–29 | 72.0 g. |

| Fractions | Weight |
|---|---|
| 30–37 | 117.0 g. |

Each of these was crystallized from a concentrated 50 percent aqueous methanol solution at 4° C. A-35512 factor B dihydrochloride thus purified contains about 4.6 percent chlorine. A solution of A-35512 factor B dihydrochloride in 66 percent aqueous dimethylformamide has a pH of about 6.5.

EXAMPLE 7

Preparation of Ionic-Chlorine-Free A-35512 Factor B

Purified A-35512 factor B dihydrochloride (1 g), obtained as described in Example 6 and dissolved in water (40 ml), was passed through a 2.5− × 18-cm. ion-exchange column (Bi0-Rad AG3-4x, in the OH$^-$cycle) at a flow rate of 0.5 ml/minute, eluting with deionized water. The first eluate (5 ml) was discarded. The following eluate (50 ml) was evaporated to dryness under vacuum to give 0.76 g. of ionic-chlorine-free A-35512 factor B as a white powder which contained approximately 1.59 percent chlorine. A solution of this ionic-chlorine-free A-35512 factor B in 66 percent aqueous dimethylformamide had a pH of 9.13.

EXAMPLE 8

Purification of A-35512 Factor A

Partially purified A-35512 factor A dihydrochloride (1 g), obtained as described in Example 5 (fractions 1–10), was dissolved in 50% aqueous methanol (5 ml). This solution was chromatographed on a 3− × 16-cm acidic alumina (M. Woelm) column, prepared as described in Example 5. The column was eluted with 50% aqueous methanol at a flow rate of 0.5 ml/minute. Fractions having a volume of 5 ml were collected; all fractions were analyzed by thin-layer bioautography as described in Example 5. On the basis of these tests, fractions 7 through 15 were combined, concentrated under reduced pressure to a small volume and lyophilized to give 0.3 g of A-35512 factor A dihydrochloride (4.71% chlorine).

EXAMPLE 9

Preparation of Ionic-Chlorine-Free A-35512 Factor A

A-35512 factor A dihydrochloride (200 mg), prepared as described in Example 8, was dissolved in water (10 ml); this solution was passed through a 1.5− × 10-cm ion-exchange column (Bio-Rad AG3-4X, in the OH$^{31}$ cycle) at a flow rate of 0.5 ml/minute, eluting with deionized water. The initial eluate (10 ml) was discarded. The following eluate (20 ml) was concentrated to a small volume under reduced pressure and then was lyophilized to give 115 mg of ionic-chlorine-free A-35512 factor A.

EXAMPLE 10

Purification of A-35512 Factor C

Partially purified A-35512 factor C dihydrochloride (15 g), obtained as described in Example 5 (fractions 25–31), was dissolved in deionized water (40 ml). This solution was applied to a 4− × 115-cm polyamide column (MN, <0.07 mm, Brinkman Instruments, Inc.; prepared in and washed overnight with water). The column was eluted with deionized water at a flow rate of about 3 ml per minute. The first effluent (250 ml) was discarded; thereafter, fractions having a volume of 24 ml were collected.

Fractions were monitored by thin-layer chromatographic bioautography. Cellulose tlc plates (on aluminum sheets; E. Merck, W. Germany), a sec-butanol:-pyridine:acetic acid:water (10:10:3:8) solvent system, and *Bacillus subtilis* as a detection organism were used. Based on the tlc results, fractions 1 through 33 were combined, concentrated under vacuum to a volume of 150 ml and lyophilized.

Two more columns were carried out, using the same conditions. Each time fractions 1 through 33 were combined, concentrated under vacuum to 150 ml, and lyophilized. The three lyophilized samples from the three columns were combined to give 12.3 grams of partially purified A-35512 factor C dihydrochloride.

This A-35512 factor C dihydrochloride was further purified by chromatography over another polyamide column as above-described, but collecting fractions having a volume of 15 ml, at a flow rate of 1 ml per minute. The column was again monitored by tlc bioautography. Fractions 36 through 58 were combined, concentrated under vacuum to a volume of 150 ml and lyophilized to give 5.3 grams of further-purified A-35512 factor C dihydrochloride.

Final purification of A-35512 factor C dihydrochloride was by chromatography on a 5− × 41-cm acidic aluminum oxide (Woelm) column. The column was packed and washed with 50% aqueous methanol. When the washing effluent was clear, the A-35512 factor C (5.3 g dissolved in 30 ml of 50% aqueous methanol) was applied to the column. The column was eluted with 50% aqueous methanol at a flow rate of one ml per minute. Fractions having a volume of 12 ml were collected and were monitored by tlc bioautography as earlier described. Fractions 22 through 74 were combined, concentrated under vacuum to a volume of 250 ml and lyophilized to give 3.86 grams of A-35512 factor C dihydrochloride.

EXAMPLE 11

Preparation of Ionic-Chlorine-Free A-35512 Factor C

A-35512 factor C dihydrochloride (200 mg), prepared as described in Example 10, was chromatographed over weakly-basic ion-exchange resin, using the procedure given in Example 9, to give 156 mg of ionic-chlorine-free A-35512 factor C. This ionic-chlorine-free A-35512 factor C contained approximately 1.90 % chlorine.

EXAMPLE 12

Purification A-35512 Factor E

Partially purified A-35512 factor E hydrochloride (8.1 g), obtained as described in Example 5 (fractions 32-44), was dissolved in deionized water (40 ml). This solution was applied to a 5− × 110-cm polyamide column (MN, <0.07 mm, Brinkman Instruments, Inc.), prepared in and washed with water overnight. The column was eluted with deionized water at a flow rate of 20 ml per 15 minutes, collecting fractions having a volume of 20 ml. At fraction 118, the eluting solvent was changed to 50% aqueous methanol. Fractions were monitored by thin-layer chromatographic bioautography as described in Example 10.

Fractions 148 through 195 contained A-35512 factor E. These fractions were combined, concentrated under reduced pressure to a volume of 150 ml, and lyophilized to give 2.7 g of A-35512 factor E hydrochloride.

A portion of this partially purified A-35512 factor E hydrochloride (615 mg) was dissolved in 50% aqueous methanol (5 ml and applied to a 1.5— × 50-cm acidic aluminum oxide (Woelm) column which had been prepared in and washed with 50% aqueous methanol until the effluent was clear. The column was eluted with 50% aqueous methanol at a flow rate of 1 ml per minute, collecting fractions having a volume of 10 ml. Again, fractions were monitored by thin-layer chromatographic bioautography. Fractions 5-8 were combined and concentrated under reduced pressure to a volume of about 10 ml. Deionized water (about 50 ml) was added, and the resulting solution was lyophilized to give 480 mg of A-35512 factor E hydrochloride.

EXAMPLE 13

Preparation of Ionic-chlorine-free A-35512 Factor E

A-35512 Factor E hydrochloride (200 mg), prepared as described in Example 12, was chromatographed over weakly-basic ion-exchange resin, using the procedure given in Example 9, to give 170 mg of ionic-chlorine-free A-35512 Factor E. This ionic-chlorine-free A-35512 factor E contained approximately 1.72% chlorine.

EXAMPLE 14

Purification of A-35512 Factor H

Partially purified A-35512 factor H hydrochloride (30 g.), obtained as described in Example 5 (fractions 1-10), was dissolved in a minimal amount of methanol:water (7:3) solution. The resulting solution was adsorbed on an acidic aluminum oxide column (3— × 60-cm; Woelm; packed in methanol and eluted with methanol until the effluent was clear). The column was then eluted with methanol at a flow-rate of four ml/minute. Fractions having a volume of 24 ml were collected. The eluting solvent was changed at fraction 59 to methanol:water (1:1).

Fractions were monitored by thin-layer chromatography using a chloroform:methanol:ammonium hydroxide (2:3:1) solvent system and *Bacillus subtilis* bioautography at alkaline pH.

Fractions 51 through 118 were combined and evaporated under vacuum to give 6.4 grams of purified A-35512 factor H hydrochloride.

EXAMPLE 15

Preparation of Ionic-Chlorine-Free A-35512 Factor H

A-35512 factor H hydrochloride (200 mg), prepared as described in Example 14, was chromatographed over weakly-basic ion-exchange resin, using the procedure given in Example 9, to give 143 mg of ionic-chlorine-free A-35512 factor H. This ionic-chlorine-free A-35512 factor H contained approximately 1.59% chlorine.

We claim:

1. A method of increasing feed-utilization efficiency in animals which comprises orally administering to said animal an amount which is effective to increase feed-utilization efficiency of a member selected from a group consisting of 1) A-35512 complex which is produced by cultivating *Streptomyces candidus* having the same identifying characteristics of NRRL 8156 in a culture medium containing assimilable sources of carbohydrate, nitrogen and inorganic salts under submerged aerobic fermentation conditions until a substantial amount of antibiotic activity is produced; 2) A-35512 factor A which is a white, amorphous, basic compound, having an approximate elemental composition of 54.29 percent carbon, 5.19 percent hydrogen, 5.58 percent nitrogen, 33.76 percent oxygen, and 1.69 percent chlorine; and which in its dihydrochloride form is a white amorphous compound which has these characteristics:

(a) an approximate elemental composition of 51.03 percent carbon, 5.10 percent hydrogen, 4.75 percent nitrogen, 34.20 percent oxygen, and 4.80 percent chlorine;

(b) an infrared absorption spectrum in KBr pellet with significant absorption maxima at the following frequencies (cm$^{-1}$): 3405 (strong), 3300 (shoulder), 2950 (weak), 1750 (weak), 1670 (strong), 1625 (shoulder), 1602 (strong), 1520 (strong), 1470 (weak), 1440 (weak), 1405 (weak), 1345 (shoulder), 1312 (medium), 1225 (medium), 1180 (weak), 1130 (weak), 1080 (strong), and 1020 (shoulder);

(c) ultraviolet absorption spectra, in acidic and neutral methanol, with an absorption maximum at 282 nm ($\epsilon$ 11,700) and, in basic methanol, an absorption maximum at 292 nm ($\epsilon$ 14,000), and with end absorption at 225 nm;

(d) a molecular weight of about 2106, as determined by titration;

(e) four titratable groups in 66% aqueous dimethylformamide with $pK_a$ values of approximately 7.35, 9.09, 10.49, and 12.44;

(f) the following specific rotations:
$[\alpha]_D^{25}$ −100 (c 1, H$_2$O)
$[\alpha]_{365}^{25}$ −400 (c 1, H$_2$O);

(g) is soluble in water, partially soluble in methanol and ethanol, and insoluble in benzene, chloroform, acetone, diethyl ether, ethyl acetate, toluene, hexane, acetonitrile and dioxane;

(h) an amino-acid analysis indicating the presence of at least five amino-acid residues, one of which is glycine;

(i) an $R_f$ value of approximately 0.21 on paper chromatography in a 1-butanol:pyridine:acetic acid:water (15:10:3:12) solvent system, using *sarcina Lutea* as the detection organism;

(j) a $^{13}$C nuclear-magnetic-resonance spectrum in D$_2$O with the following characteristics:

| No. | PPM | Height (%) |
|---|---|---|
| 3 | 175.3 | 0.8 |
| 4 | 173.0 | 2.1 |
| 5 | 172.1 | 2.0 |
| 6 | 171.4 | 1.5 |
| 7 | 170.9 | 2.7 |
| 8 | 170.5 | 2.3 |
| 9 | 169.5 | 1.6 |
| 10 | 159.0 | 1.3 |
| 11 | 157.9 | 2.3 |
| 12 | 156.2 | 2.6 |
| 13 | 155.6 | 2.3 |
| 14 | 155.3 | 2.4 |
| 15 | 154.4 | 1.1 |
| 16 | 136.3 | 1.4 |
| 17 | 136.0 | 1.0 |
| 18 | 135.1 | 1.4 |
| 19 | 133.5 | 1.2 |
| 20 | 129.6 | 1.6 |
| 21 | 129.1 | 1.7 |
| 22 | 128.7 | 1.8 |
| 23 | 127.5 | 1.0 |
| 24 | 126.0 | 1.4 |
| 25 | 124.3 | 2.8 |
| 26 | 122.1 | 1.6 |
| 27 | 109.9 | 1.3 |
| 28 | 107.4 | 1.6 |
| 29 | 101.7 | 0.9 |
| 30 | 77.6 | 3.8 |

-continued

| No. | PPM | Height (%) |
|---|---|---|
| 31 | 76.3 | 4.6 |
| 32 | 75.5 | 2.6 |
| 33 | 74.8 | 2.5 |
| 34 | 74.5 | 2.4 |
| 35 | 73.4 | 3.7 |
| 36 | 72.8 | 6.0 |
| 37 | 72.0 | 4.4 |
| 38 | 70.9 | 7.0 |
| 39 | 69.6 | 2.8 |
| 40 | 67.4 | 90.9* |
| 41 | 65.4 | 1.7 |
| 42 | 61.7 | 3.1 |
| 43 | 56.7 | 1.7 |
| 44 | 55.5 | 1.3 |
| 45 | 54.7 | 0.8 |
| 46 | 24.6 | 0.9 |
| 47 | 19.1 | 1.7 |
| 48 | 17.9 | 2.0 |
| 49 | 17.2 | 1.9 |
| 50 | 16.7 | 3.2 |
| 51 | 16.2 | 3.0 |

(k) is stable for 72 hours in aqueous solutions having a pH of from about 3 to about 10;

(3) A-35512 factor B which is a white amorphous, basic compound having:

(a) an approximate elemental composition of 53.97 percent carbon, 4.75 percent hydrogen, 5.25 percent nitrogen, 34.29 percent oxygen, and 1.59 percent chlorine;

(b) ultraviolet absorption spectra, in acidic and neutral methanol, with an absorption maximum at 282 nm (ε 15000) and, in basic methanol, an absorption maximum at 292 nm (ε 16000);

(c) a molecular weight of about 2143, as determined by titration;

(d) four titratable groups in 66% aqueous dimethylformamide with $pK_a$ values of approximately 7.15, 8.81, 10.20, and 12.00;

(e) the following specific rotations;
$[\alpha]_D^{25} -123°$ (c 1, $H_2O$)
$[\alpha]_{365}^{25} -446°$ (c 1, $H_2O$);

(f) an empirical formula in the range of $C_{97-99}H_{101-105}N_{8-9}O_{46-48}Cl$;

and which in its dihydrochloride form is a white, hydroscopic, crystalline compound (from 50 percent aqueous methanol) which has these characteristics:

(a') an approximate elemental composition of 52.57 percent carbon, 4.80 percent hydrogen, 5.66 percent nitrogen, 32.86 percent oxygen, and 4.51 percent chlorine;

(b') an infrared absorption spectrum in KBr pellet with significant absorption maxima at the following frequencies (cm⁻¹): 3420 (strong), 3300 (shoulder), 2950 (weak), 1752 (weak), 1675 (strong), 1630 (shoulder), 1605 (strong), 1520 (strong), 1470 (weak), 1440 (weak), 1410 (weak), 1345 (shoulder), 1312 (medium), 1225 (medium), 1180 (weak), 1135 (weak), 1080 strong), and 1020 (weak);

(c') ultraviolet absorption spectra, in acidic and neutral methanol, with an absorption maximum at 282 nm (ε 12,000) and, in basic methanol, an absorption maximum at 292 nm (ε 14,000), and with end absorption at 225 nm;

(d') a molecular weight of about 2027, as determined by titration;

(e') four titratable groups in 66% dimethylformamide with $pK_a$ values of approximately 7.15, 8.87, 10.30, and 12.10;

(f') the following specific rotations:
$[\alpha]_D^{25} -128°$ (c 1, $H_2O$)
$[\alpha]_{365}^{25} 31\ 475°$ (c 1, $H_2O$);

(g') is soluble in water, partially soluble in methanol and ethanol, and insoluble in benzene, chloroform, acetone, diethyl ether, ethyl acetate, toluene, hexane, acetonitrile and dioxane;

(h') an amino-acid analysis indicating the presence of at least five amino-acid residues, one of which is glycine;

(i') an $R_f$ value of approximately 0.34 on paper chromatography in a 1-butanol:pyridine:acetic acid:water (15:10:3:12) solvent system, using *Sarcina lutea* as the detection organism;

(j') a $^{13}C$ nuclear-magnetic-resonance spectrum in $D_2O$ with the following characteristics:

| No. | PPM | Height (%) |
|---|---|---|
| 2 | 173.0 | 4.1 |
| 3 | 171.9 | 3.7 |
| 4 | 171.6 | 3.3 |
| 5 | 171.0 | 5.8 |
| 6 | 170.8 | 5.0 |
| 7 | 169.6 | 3.6 |
| 8 | 159.0 | 4.1 |
| 9 | 157.9 | 4.4 |
| 10 | 157.5 | 3.7 |
| 11 | 156.6 | 4.8 |
| 12 | 155.6 | 6.1 |
| 13 | 155.3 | 4.2 |
| 14 | 154.9 | 3.3 |
| 15 | 154.3 | 4.2 |
| 16 | 151.7 | 3.3 |
| 17 | 144.3 | 3.1 |
| 18 | 136.7 | 3.5 |
| 19 | 136.1 | 4.9 |
| 20 | 135.4 | 4.0 |
| 21 | 135.2 | 4.4 |
| 22 | 133.6 | 4.2 |
| 23 | 133.3 | 4.1 |
| 24 | 129.8 | 1.7 |
| 25 | 129.3 | 3.0 |
| 26 | 128.8 | 2.6 |
| 27 | 127.6 | 1.5 |
| 28 | 126.1 | 3.9 |
| 29 | 124.2 | 5.6 |
| 30 | 122.4 | 1.4 |
| 31 | 122.0 | 4.4 |
| 32 | 120.7 | 3.3 |
| 33 | 116.5 | 2.7 |
| 34 | 109.5 | 0.8 |
| 35 | 108.2 | 1.1 |
| 36 | 107.7 | 2.7 |
| 37 | 104.5 | 1.7 |
| 38 | 101.8 | 2.9 |
| 39 | 100.9 | 1.6 |
| 40 | 98.3 | 1.0 |
| 41 | 76.9 | 1.2 |
| 42 | 76.1 | 1.8 |
| 43 | 74.1 | 2.0 |
| 44 | 73.5 | 2.7 |
| 45 | 72.7 | 2.4 |
| 46 | 72.3 | 4.0 |
| 47 | 71.0 | 7.1 |
| 48 | 70.3 | 2.5 |
| 49 | 69.7 | 2.5 |
| 51 | 64.6 | 1.2 |
| 52 | 62.0 | 1.5 |
| 53 | 58.0 | 1.3 |
| 54 | 56.8 | 1.7 |
| 55 | 55.4 | 3.9 |
| 56 | 54.3 | 2.5 |
| 57 | 24.5 | 2.0 |
| 58 | 17.9 | 3.0 |
| 59 | 17.2 | 2.0 |
| 60 | 16.3 | 2.5 |

(k') is stable for as much as 72 hours in aqueous solutions having a pH of from about 3 to about 10;

(1') an X-ray powder diffraction pattern (Cu⁺⁺λ radiation, 1.5405 λ, nickel filter) having the following interplanar spacings in angstroms (d):

| d | Relative Intensity |
|---|---|
| 17.15 | 100 |
| 12.90 | 80 |
| 10.85 | 70 |
| 9.25 | 70 |
| 8.87 | 60 |
| 8.22 | 50 |
| 7.86 | 50 |
| 6.93 | 40 |
| 6.20 | 40 |
| 5.62 | 40 |
| 5.04 | 05 |
| 4.02 | 02 |
| 3.54 | 02 |

(m') contains the following sugars: glucose, fucose, mannose, rhamnose, and 3-amino-2,3,6-trideoxy-3-C-methyl-L-xylo-hexopyranose;

(n') has at least one hydroxyl group capable of esterification;

(4) A-35512 factor C which is a white, amorphous, basic compound having:
(a) an approximate elemental composition of 53.93 percent carbon, 5.15 percent hydrogen, 5.80 percent nitrogen, 32.35 percent oxygen, and 1.90 percent chlorine;
(b) an empirical formula of approximately $C_{84}H_{99}N_8O_{38}Cl$, based on elemental composition;
(c) a molecular weight of approximately 1862; and which in its dihydrochloride form is a white amorphous compound which has these characteristics:
  (a') an approximate elemental composition of 51.76 percent carbon, 5.07 percent hydrogen, 5.61 percent nitrogen, 30.29 percent oxygen, and 4.88 percent chlorine;
  (b') an infrared absorption spectrum in KBr pellet with significant absorption maxima at the following frequencies (cm⁻¹): 3370 (strong), 3280 (shoulder), 3040 (shoulder), 2980 (shoulder), 2920 (weak), 1740 (weak), 1658 (strong), 1620 (weak), 1589 (medium), 1503 (strong), 1460 (weak), 1428 (medium), 1385 (weak), 1330 (weak), 1295 (medium), 1210 (strong), 1162 (medium), 1120 (weak), 1060 (strong), and 1005 (medium);
  (c') ultraviolet absorption spectra with an absorption maximum, in acidic and neutral methanol, at 282 nm (ε 14,600) and, in basic methanol, at 292 nm (ε 16,400);
  (d') a molecular weight of about 1982, as determined by titration;
  (e') three titratable groups in 66% dimethylformamide with $pK_a$ values of approximately 7.30, 8.92, and 10.99;
  (f') the following specific rotations:
  $[\alpha]_D^{25}$ −161° (c 1.05, H₂O)
  $[\alpha]_{365}^{25}$ −614° (c 1.05, H₂O);
  (g') is soluble in water, dimethyl sulfoxide, and aqueous dimethylformamide, partially soluble in methanol and ethanol, and insoluble in benzene, chloroform, acetone, diethyl ether, ethyl acetate, toluene, hexane, acetonitrile, and dioxane;
  (h') an amino-acid analysis indicating the presence of five amino-acid residues, one of which appears to be glycine;
  (i') an $R_f$ value of approximately 0.46 on paper chromatography in a 1-butanol:pyridine:acetic acid:water (15:10:3:12) solvent system, using *Sarcina lutea* as the detection organism;
  (j') a ¹³C nuclear-magnetic-resonance spectrum in D₂O with the following characteristics:

| No. | PPM | Height (%) |
|---|---|---|
| 1 | 172.9 | 2.5 |
| 2 | 172.2 | 2.0 |
| 3 | 171.5 | 2.2 |
| 4 | 171.0 | 3.9 |
| 5 | 169.6 | 2.0 |
| 6 | 158.6 | 1.8 |
| 7 | 157.8 | 3.0 |
| 8 | 156.5 | 2.1 |
| 9 | 156.1 | 2.8 |
| 10 | 155.6 | 4.2 |
| 11 | 154.6 | 3.9 |
| 12 | 151.1 | 1.5 |
| 13 | 143.3 | 1.4 |
| 14 | 136.0 | 3.2 |
| 15 | 135.4 | 2.7 |
| 16 | 133.2 | 3.7 |
| 17 | 128.7 | 2.3 |
| 18 | 126.5 | 3.1 |
| 19 | 124.6 | 2.1 |
| 20 | 129.3 | 2.7 |
| 21 | 121.5 | 2.2 |
| 22 | 120.1 | 1.2 |
| 23 | 118.0 | 1.7 |
| 24 | 116.5 | 1.2 |
| 25 | 107.8 | 2.7 |
| 26 | 104.5 | 1.9 |
| 27 | 101.7 | 1.9 |
| 28 | 94.5 | 1.0 |
| 29 | 75.9 | 3.0 |
| 30 | 74.3 | 2.0 |
| 31 | 73.4 | 2.3 |
| 32 | 72.1 | 3.5 |
| 33 | 70.9 | 4.3 |
| 34 | 68.7 | 2.9 |
| 36 | 64.3 | 1.3 |
| 37 | 62.2 | 1.6 |
| 38 | 56.1 | 1.4 |
| 39 | 55.2 | 3.5 |
| 40 | 54.2 | 2.1 |
| 41 | 24.3 | 1.9 |
| 42 | 17.9 | 2.2 |
| 43 | 17.1 | 2.0 |
| 44 | 16.2 | 2.0 |

(k') is stable in aqueous solutions having a pH of from about 3 to about 10, for as long as 146 hours;

(1') an empirical formula in the range of $C_{83-85}H_{97-101}N_8O_{37-39}Cl_3$ and an approximate empirical formula of $C_{84}H_{97}N_8O_{38}Cl·2HCl$, based on elemental composition;

(5) A-35512 factor E which is a white, amorphous, basic compound having an approximate elemental composition of 54.84 percent carbon, 4.73 percent hydrogen, 5.26 percent nitrogen, 32.67 percent oxygen, and 1.72 percent chlorine; and which in its hydrochloride form is a white amorphous compound which has these characteristics:
(a) an approximate elemental composition of 52.67 percent carbon, 4.59 percent hydrogen, 5.55 percent nitrogen, 33.51 percent oxygen, and 3.62 percent chlorine;
(b) an infrared absorption spectrum in KBr pellet with significant absorption maxima at the following frequencies (cm⁻¹): 3360 (strong), 3220 (shoulder), 2900 (weak), 1725 (weak), 1650 (strong), 1580 (medium), 1498 (strong), 1450 (weak), 1419 (weak), 1295 (medium), 1205 (medium), 1172 (medium), 1110 (weak), 1060 (strong), and 1000 (weak);
(c) ultraviolet absorption spectra with the following absorption maxima: in neutral methanol, 270 nm (sh) and 359 nm (ε 16,216); in acidic methanol, 286 nm (ε 18,018) and 310 nm (sh); in basic methanol, 270 nm (sh), 300 nm (ε 16,216), and 354 nm (ε 17,568);

(d) a molecular weight of about 2018, as determined by titration;

(e) three titratable groups in 66% aqueous dimethylformamide with $pK_a$ values of approximately 6.30, 9.09, and 11.62;

(f) the following specific rotation:

$[\alpha]_D^{25} -108.3$ (c 1, $H_2O$);

(g) is soluble in water, partially soluble in methanol and ethanol, and insoluble in benzene, chloroform, acetone, diethyl ether, ethyl acetate, toluene, hexane, acetonitrile and dioxane;

(h) an amino-acid analysis indicating the presence of six amino-acid residues;

(i) an $R_f$ value of approximately 0.64 on paper chromatography in a 1-butanol:pyridine:acetic acid:water (15:10:3:12) solvent system, using *Sarcina Tutea* as the detection organism;

(6) A-35512 factor H which is a white, amorphous, basic compound having:

(a) an approximate elemental composition of 53.76 percent carbon, 5.32 percent hydrogen, 5.53 percent nitrogen, 33.48 percent oxygen, and 1.59 percent chlorine;

(b) an empirical formula in the range of $C_{85-87}H_{103-107}N_8O_{38-40}Cl$;

(c) a molecular weight of approximately 1908, based on elemental composition; and which in its hydrochloride form is a white amorphous compound which has these characteristics:

(a′) an approximate elemental composition of 53.10 percent carbon, 5.37 percent hydrogen, 5.35 percent nitrogen, 30.12 percent oxygen, and 3.78 percent chlorine;

(b′) an infrared absorption spectrum in KBr pellet with significant absorption maxima at the following frequencies ($cm^{-1}$): 3410 (strong), 3240 (shoulder), 2940 (weak), 1670 (strong), 1630 (shoulder), 1605 (strong), 1520 (strong), 1470 (weak), 1442 (weak), 1400 (weak), 1345 (shoulder), 1310 (medium), 1225 (medium), 1180 (weak), 1135 (weak), 1080 (strong), and 1020 (shoulder).

(c′) ultraviolet absorption spectra which show, in acidic and neutral methanol, an absorption maximum at 282 nm (ε 12,500) and, in basic methanol, an absorption maximum at 292 nm (ε 14,000), and end absorption at 225 nm;

(d′) a molecular weight of approximately 1660, as determined by titration;

(e′) five titratable groups in 66% aqueous dimethylformamide with $pK_a$ values of approximately 5.0, 7.46, 9.80, 11.43 and 13.02;

(f′) the following specific rotation:
$[\alpha]_D^{25} -123.5°$ (c 1, $H_2O$);

(g′) is soluble in water, partially soluble in methanol and ethanol, and insoluble in benzene, chloroform, acetone, diethyl ether, ethyl acetate, toluene, hexane, acetonitrile and dioxane;

(h′) an amino-acid analysis indicating the presence of five amino-acid groups, one of which is glycine;

(i′) approximate $R_f$ values in the following paper-chromatographic systems, using *Sarcina lutea* as the detection organism:

| Solvent System | $R_f$ Value |
| --- | --- |
| 1-butanol:pyridine:acetic acid:water (15:10:3:12) | 0.15 |
| $CH_3OH$:0.1N HCl (3:1) | 0.47 |
| 1-propanol:$NH_4OH$:$H_2O$ (6:3:1) | 0.11 |

(j′) a $^{13}C$ nuclear-magnetic-resonance spectrum in $D_2O$ with the following characteristics:

| No. | PPM | Height (%) |
| --- | --- | --- |
| 2 | 177.2 | 2.7 |
| 3 | 171.6 | 5.2 |
| 4 | 170.9 | 5.8 |
| 5 | 169.6 | 4.7 |
| 6 | 158.9 | 3.1 |
| 7 | 157.6 | 4.3 |
| 8 | 156.6 | 3.8 |
| 9 | 155.6 | 4.1 |
| 10 | 155.4 | 3.8 |
| 11 | 154.3 | 2.4 |
| 12 | 151.3 | 1.6 |
| 13 | 137.7 | 2.0 |
| 14 | 136.7 | 2.2 |
| 15 | 136.0 | 4.0 |
| 16 | 135.3 | 1.9 |
| 17 | 133.5 | 5.0 |
| 18 | 129.4 | 3.7 |
| 19 | 127.3 | 1.3 |
| 20 | 126.1 | 3.2 |
| 21 | 124.2 | 6.9 |
| 22 | 122.6 | 4.1 |
| 23 | 107.6 | 2.7 |
| 24 | 101.8 | 1.8 |
| 25 | 76.2 | 2.8 |
| 26 | 73.5 | 4.4 |
| 27 | 72.3 | 7.4 |
| 28 | 71.0 | 12.2 |
| 29 | 69.7 | 4.6 |
| 31 | 61.6 | 3.5 |
| 32 | 56.8 | 1.8 |
| 33 | 55.4 | 2.8 |
| 34 | 55.0 | 1.5 |
| 35 | 24.5 | 2.6 |
| 36 | 17.9 | 4.6 |
| 37 | 17.2 | 2.6 |
| 38 | 16.3 | 3.6 |

(k′) is stable for as much as 72 hours in aqueous solutions having a pH of from about 3 to about 10; and (7) the pharmaceutically-acceptable salts of A-35512 factors A, B, C, E, and H.

2. The method of claim 1 wherein the member is A-35512 complex.

3. The method of claim 1 wherein the member is A-35512 factor B.

4. The method of claim 1 wherein the animal is a ruminant.

5. The method of claim 4 wherein the member is A-35512 complex.

6. The method of claim 4 wherein the member is A-35512 factor B.

7. The method of claim 1 wherein the animal is a member of the poultry group.

8. The method of claim 7 wherein the member is A-35512 complex.

9. The method of claim 7 wherein the member is A-35512 factor B.

* * * * *

UNITED STATES PATENT AND TRADEMARK OFFICE
CERTIFICATE OF CORRECTION

PATENT NO. : 4,083,964
DATED : April 11, 1978
INVENTOR(S) : Karl H. Michel and Calvin E. Higgens It is certified that error appears in the above-identified patent and that said Letters Patent are hereby corrected as shown below:

Column 3, line 45, insert at margin -- *dioxane standard --;
   line 49, delete "bioautography 5. fractions".
Column 11, line 18, "6 inches" should read -- 6 feet --.
Column 12, line 38, "fiar" should read -- fair --; line 49, "facicled" should read -- fascicled --.
Column 19, line 28, "test" should read -- tests --; line 38, "provment" should read -- provement --.
Column 22, line 62, "ffractions" should read -- fractions --; line 61, "bioatography" should read -- bioautography --.
Column 23, line 51, "$OH^{31}$" should read -- $OH^-$ --.
Column 25, line 5, "(5 ml" should read -- (5 ml) --.
Column 26, line 43, "sarcina Lutea" should read -- Sarcina lutea --.
Column 27, line 60, "strong)" should read -- (strong) --.
Column 28, line 6, "31 475°" should read -- -475° --.
Column 29, line 1, "($Cu^{++}\lambda$" should read -- ($Cu^{++}$ --.
Column 31, line 23, "Tutea" should read -- lutea --; lines 36 and 37, "and which in its hydrochloride form is a white amorphous compound which has these characteristics: should be at margin.

Signed and Sealed this

Twenty-third Day of October 1979

[SEAL]

Attest:

RUTH C. MASON
Attesting Officer

LUTRELLE F. PARKER
Acting Commissioner of Patents and Trademarks